(12) United States Patent
Manolakos et al.

(10) Patent No.: US 11,445,465 B2
(45) Date of Patent: Sep. 13, 2022

(54) UE-BASED POSITIONING

(71) Applicant: QUALCOMM Incorporated, San Diego, CA (US)

(72) Inventors: Alexandros Manolakos, San Diego, CA (US); Lorenzo Ferrari, Oakland, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/846,301

(22) Filed: Apr. 11, 2020

(65) Prior Publication Data
US 2021/0160812 A1    May 27, 2021

(30) Foreign Application Priority Data

Nov. 21, 2019   (GR) .............................. 20190100528

(51) Int. Cl.
| | |
|---|---|
| H04W 64/00 | (2009.01) |
| H04B 17/318 | (2015.01) |
| H04W 4/02 | (2018.01) |
| H04W 4/029 | (2018.01) |

(52) U.S. Cl.
CPC ........ H04W 64/003 (2013.01); H04B 17/318 (2015.01); H04W 4/025 (2013.01); H04W 4/029 (2018.02)

(58) Field of Classification Search
CPC ... H04W 64/003; H04W 4/029; H04W 4/025; H04W 64/00; H04B 17/318; G01S 5/027
See application file for complete search history.

(56) References Cited

U.S. PATENT DOCUMENTS

| | | | |
|---|---|---|---|
| 2006/0178154 A1* | 8/2006 | Farmer ................ | G01S 5/0205 455/456.1 |
| 2008/0076450 A1* | 3/2008 | Nanda .................. | G01D 21/00 455/456.1 |
| 2008/0122690 A1* | 5/2008 | Wan ...................... | G01S 19/05 342/357.42 |
| 2011/0269481 A1* | 11/2011 | Halfmann ............ | G01S 5/0027 455/456.1 |
| 2011/0312355 A1* | 12/2011 | Cheng .................. | H04J 11/0036 455/501 |
| 2014/0187257 A1* | 7/2014 | Emadzadeh .......... | G01S 5/0242 455/456.1 |
| 2015/0271632 A1* | 9/2015 | Venkatraman ........ | G01S 19/48 455/456.2 |

(Continued)

OTHER PUBLICATIONS

International Search Report and Written Opinion—PCT/US2020/054386—ISA/EPO—dated Jan. 22, 2021.

(Continued)

Primary Examiner — Dinh Nguyen
(74) Attorney, Agent, or Firm — Qualcomm Incorporated

(57) ABSTRACT

A method of determining a location of a user equipment includes: obtaining, at the user equipment, a position-determination model associated with a coarse location of the user equipment; determining one or more first positioning measurements at the user equipment; and determining, at the user equipment, the location of the user equipment based on the one or more first positioning measurements and the position-determination model.

45 Claims, 10 Drawing Sheets

(56) References Cited

U.S. PATENT DOCUMENTS

| | | | | |
|---|---|---|---|---|
| 2016/0112150 A1* | 4/2016 | Godefroy | .............. | H04W 64/00 |
| | | | | 370/252 |
| 2017/0041750 A1* | 2/2017 | Jose | ......................... | G01S 5/10 |
| 2017/0212206 A1* | 7/2017 | Kim | ...................... | H04W 8/005 |
| 2017/0311180 A1* | 10/2017 | Jalden | .................. | H04B 7/0617 |
| 2019/0082346 A1* | 3/2019 | Tang | ..................... | H04W 24/02 |
| 2020/0111348 A1* | 4/2020 | Gentile | ................ | G08G 1/0145 |
| 2020/0389759 A1* | 12/2020 | Wang | ..................... | H04W 4/023 |

OTHER PUBLICATIONS

Liu W., et al., "Two-Phase Indoor Positioning Technique in Wireless Networking Environment", Communications (ICC), 2010 IEEE International Conference on, IEEE, Piscataway, NJ, USA, May 23, 2010 (May 23, 2010), pp. 1-5, XP031703039, ISBN: 978-1-4244-6402-9, Section II-A, 1. 7-14, p. 2, left-hand column line 6-line 8 p. 1, r.col, 2nd paragraph, 1. 1-8 Sections I, II-D, II-E.

\* cited by examiner

| DL/UL Reference Signals | UE Measurements | Positioning techniques |
|---|---|---|
| DL PRS | DL RSTD | DL-TDOA |
| DL PRS | DL PRS RSTD | DL-TDOA, DL-AoD, Multi-RTT |
| DL PRS / SRS for positioning | UE Rx-Tx time difference | Multi-RTT |
| SSB / CSI-RS for RRM | SS-RSRP (RSRP for RRM)<br>SS-RSRQ (for RRM)<br>CSI-RSRP (for RRM)<br>CSI-RSRQ (for RRM)<br>SS-RSRPB (for RRM) | E-CID |

FIG. 4

| Request type | Position-determination technique |
|---|---|
| Assistance data | OTDOA |

| 710 | 720 | 730 |
|---|---|---|
| Request type | Position-determination technique | Coarse location |
| Position-determination-model updates | OTDOA | Service BSID (serving BSID location) |

| Reference TRP | Neighbor TRP | PRS | UE Rx-Tx | RSRP | TDOA | Quality metrics ||| Geographic region (Lat., Long., Radius) |
|---|---|---|---|---|---|---|---|---|---|
| | | | | | | Unc. | Resolution | Measurements | |
| ID1 | ID2 | PRS1 | T102 | P034 | T027 | V011 | R005 | M1, M2 | X1, Y1, R1 |
| ID1 | ID2 | PRS2 | T104 | P030 | T024 | V015 | R005 | M1, M2 | X1, Y1, R1 |
| ID1 | ID2 | PRS3 | T110 | P040 | T021 | V010 | R003 | M1, M3 | X1, Y1, R1 |

FIG. 8

| Reference TRP | Neighbor TRP | UE Rx-Tx | RSRP | TDOA | Unc1 | Unc2 | Location | Location confidence | Timestamp |
|---|---|---|---|---|---|---|---|---|---|
| ID1 | ID2 | T102 | P034 | T027 | U011 | U143 | Latitude X Longitude Y | Conf | mm/dd/yy hh/mm/ss |

FIG. 9

UE-BASED POSITIONING

CROSS-REFERENCE TO RELATED APPLICATION

This application claims the benefit of Greek Patent Application No. 20190100528, filed Nov. 21, 2019, entitled "UE-BASED POSITIONING," which is assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the measurement location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination. Problematically, the transmission of these signals in a predictable manner may make proprietary base station information (e.g., determining base station ID and location) easily determinable.

SUMMARY

An example user equipment includes: a receiver configured to receive wireless signals; a memory; and a processor communicatively coupled to the receiver and the memory, the processor configured to: obtain a position-determination model associated with a coarse location of the user equipment; determine one or more first positioning measurements; and determine a location of the user equipment based on the one or more first positioning measurements and the position-determination model.

Implementations of such a user equipment may include one or more of the following features. To obtain the position-determination model, the processor is configured to use a first feature vector to train the position-determination model, the first feature vector including second positioning measurements from another user equipment and a corresponding location. The user equipment includes a transmitter communicatively coupled to the processor, and the processor is configured to send a request for the first feature vector via the transmitter in at least one of an uplink communication or a sidelink communication. The request for the first feature vector includes a second feature vector including third positioning measurements corresponding to the second positioning measurements. The processor is configured to establish the position-determination model based on the first feature vector. The position-determination model is a first position-determination model, and the processor is configured to adapt, based on the first feature vector, a second position-determination model to obtain the first position-determination model. The second positioning measurements include: Channel Energy Response (CER) information including a reference signal receive power (RSRP) indication, or a received signal strength indication (RSSI), or a transmission/reception point identity (TRP ID), or a combination thereof; or Reference Signal Time Difference (RSTD) information including a reference TRP ID, a neighbor TRP ID, a user equipment receive-transmit time difference (UE Rx-Tx), the RSRP indication and at least one of associated positioning-signal resources or associated positioning-signal resource sets, and at least one timing measurement quality metric.

Also or alternatively, implementations of such a user equipment may include one or more of the following features. The user equipment includes a transmitter communicatively coupled to the processor, and to obtain the position-determination model the processor is configured to determine the coarse location of the user equipment and to send a request for the position-determination model via the transmitter, the request including the coarse location of the user equipment. The user equipment includes a transmitter communicatively coupled to the processor, and to obtain the position-determination model the processor is configured to send a request for the position-determination model to another user equipment in a sidelink communication. The user equipment includes a transmitter communicatively coupled to the processor, and to obtain the position-determination model the processor is configured to send a request for the position-determination model via the transmitter, the request for the position-determination model including an indication of a position-determination technique corresponding to the position-determination model. The processor is configured to use a received position-determination-model update to obtain the position-determination model. The processor is configured to determine whether to use information received by the receiver to obtain the position-determination model based on a timestamp included in the information received by the receiver. The processor is configured to affect measurement of the wireless signals based on the position-determination model. The user equipment includes a transmitter communicatively coupled to the processor, and the processor is configured to affect transmission of a sounding reference signal by the transmitter based on the position-determination model.

An example method of determining a location of a user equipment includes: obtaining, at the user equipment, a position-determination model associated with a coarse location of the user equipment; determining one or more first positioning measurements at the user equipment; and determining, at the user equipment, the location of the user equipment based on the one or more first positioning measurements and the position-determination model.

Implementations of such a method may include one or more of the following features. The user equipment is a first user equipment, and obtaining the position-determination model includes training the position-determination model using a first feature vector including second positioning measurements from a second user equipment and a corresponding location. The method includes sending a request for the first feature vector wirelessly from the first user equipment in at least one of an uplink communication or a sidelink communication. The request for the first feature vector includes a second feature vector including third positioning measurements corresponding to the second positioning measurements. Obtaining the position-determination model includes establishing the position-determination model based on the first feature vector. The position-determination model is a first position-determination model, and obtaining the first position-determination model includes adapting a second position-determination model based on the first feature vector. The second positioning measurements include: Channel Energy Response (CER) information including a reference signal receive power (RSRP) indication, or a received signal strength indication (RSSI), or a transmission/reception point identity (TRP ID), or a combination thereof; or Reference Signal Time Difference (RSTD) information including a reference TRP ID, a neighbor TRP ID, a user equipment receive-transmit time difference (UE Rx-Tx), the RSRP indication and at least one of associated positioning-signal resources or associated positioning-signal resource sets, and at least one timing measurement quality metric.

Also or alternatively, implementations of such a method may include one or more of the following features. The method includes determining, at the user equipment, the coarse location of the user equipment, and obtaining the position-determination model includes sending a request for the position-determination model, the request including the coarse location of the user equipment. The user equipment is a first user equipment, and obtaining the position-determination model includes sending a request for the position-determination model to a second user equipment in a sidelink communication. Obtaining the position-determination model includes sending a request for the position-determination model, and the request for the position-determination model includes an indication of a position-determination technique corresponding to the position-determination model. Obtaining the position-determination model includes using a received position-determination-model update to obtain the position-determination model. Obtaining the position-determination model includes determining whether to use information received by the user equipment to obtain the position-determination model based on a timestamp included in the information received by the user equipment. Determining the one or more first positioning measurements is based on the position-determination model. The method includes transmitting a sounding reference signal based on the position-determination model.

Another example user equipment includes: obtaining means for obtaining a position-determination model associated with a coarse location of the user equipment; means for determining one or more first positioning measurements; and means for determining a location of the user equipment based on the one or more first positioning measurements and the position-determination model.

Implementations of such a user equipment may include one or more of the following features. The obtaining means are for training the position-determination model using a first feature vector including second positioning measurements from a second user equipment and a corresponding location. The obtaining means are for sending a request for the first feature vector wirelessly from the user equipment in at least one of an uplink communication or a sidelink communication. The request for the first feature vector includes a second feature vector including third positioning measurements corresponding to the second positioning measurements. The obtaining means are for establishing the position-determination model based on the first feature vector. The position-determination model is a first position-determination model, and the obtaining means are for adapting a second position-determination model based on the first feature vector to obtain the first position-determination model. The second positioning measurements include: Channel Energy Response (CER) information including a reference signal receive power (RSRP) indication, or a received signal strength indication (RSSI), or a transmission/reception point identity (TRP ID), or a combination thereof; or Reference Signal Time Difference (RSTD) information including a reference TRP ID, a neighbor TRP ID, a user equipment receive-transmit time difference (UE Rx-Tx), the RSRP indication and at least one of associated positioning-signal resources or associated positioning-signal resource sets, and at least one timing measurement quality metric.

Also or alternatively, implementations of such a user equipment may include one or more of the following features. The user equipment includes means for determining the coarse location of the user equipment, and the obtaining means are for sending a request for the position-determination model, the request including the coarse location of the user equipment. The obtaining means are for sending a request for the position-determination model to a second user equipment in a sidelink communication. The obtaining means are for sending a request for the position-determination model, and the request for the position-determination model includes an indication of a position-determination technique corresponding to the position-determination model. The obtaining means are for using a received position-determination-model update to obtain the position-determination model. The obtaining means are for determining whether to use information received by the user equipment to obtain the position-determination model based on a timestamp included in the information received by the user equipment. The means for determining the one or more first positioning measurements are for determining the one or more first positioning measurements based on the position-determination model. The user equipment includes means for transmitting a sounding reference signal based on the position-determination model.

An example non-transitory, processor-readable storage medium includes processor-readable instructions configured to cause a processor of a user equipment to: obtain a position-determination model associated with a coarse location of the user equipment; determine one or more first positioning measurements; and determine a location of the user equipment based on the one or more first positioning measurements and the position-determination model.

Implementations of such a storage medium may include one or more of the following features. The user equipment is a first user equipment, and the instructions configured to cause the processor to obtain the position-determination model include instructions configured to cause the processor to train the position-determination model using a first feature vector including second positioning measurements from a second user equipment and a corresponding location. The storage medium includes instructions configured to cause the processor to send a request for the first feature vector wirelessly from the first user equipment in at least one of an uplink communication or a sidelink communication. The request for the first feature vector includes a second feature vector including third positioning measurements corresponding to the second positioning measurements. The instructions configured to cause the processor to obtain the position-determination model include instructions configured to cause the processor to establish the position-determination model based on the first feature vector. The position-determination model is a first position-determination model, and the instructions configured to cause the processor to obtain the first position-determination model include instructions configured to cause the processor to adapt a second position-determination model based on the first feature vector. The second positioning measurements include: Channel Energy Response (CER) information including a reference signal receive power (RSRP) indication, or a received signal strength indication (RSSI), or a transmission/reception point identity (TRP ID), or a combination thereof; or Reference Signal Time Difference (RSTD) information including a reference TRP ID, a neighbor TRP ID, a user equipment receive-transmit time difference (UE Rx-Tx), the RSRP indication and at least one of associated positioning-signal resources or associated positioning-signal resource sets, and at least one timing measurement quality metric.

Also or alternatively, implementations of such a storage medium may include one or more of the following features. The storage medium includes instructions configured to cause the processor to determine the coarse location of the user equipment, and the instructions configured to cause the processor to obtain the position-determination model include instructions configured to cause the processor to send a request for the position-determination model, the request including the coarse location of the user equipment. The instructions configured to cause the processor to obtain the position-determination model include instructions configured to cause the processor to send a request for the position-determination model to another user equipment in a sidelink communication. The instructions configured to cause the processor to obtain the position-determination model include instructions configured to cause the processor to send a request for the position-determination model, and the request for the position-determination model includes an indication of a position-determination technique corresponding to the position-determination model. The instructions configured to cause the processor to obtain the position-determination model include instructions configured to cause the processor to use a received position-determination-model update to obtain the position-determination model. The instructions configured to cause the processor to obtain the position-determination model include instructions configured to cause the processor to determine whether to use information received by the user equipment to obtain the position-determination model based on a timestamp included in the information received by the user equipment. The instructions configured to cause the processor to determine the one or more first positioning measurements are configured to cause the processor to determine the one or more first positioning measurements based on the position-determination model. The storage medium includes instructions configured to cause the processor to transmit a sounding reference signal based on the position-determination model.

BRIEF DESCRIPTION OF THE DRAWINGS

FIG. 4 is a table of corresponding reference signals, user equipment measurements, and positioning techniques.

FIGS. 6-8 are simplified examples of assistance data requests.

FIGS. 9-10 are simplified examples of assistance data responses.

DETAILED DESCRIPTION

Figure 1:
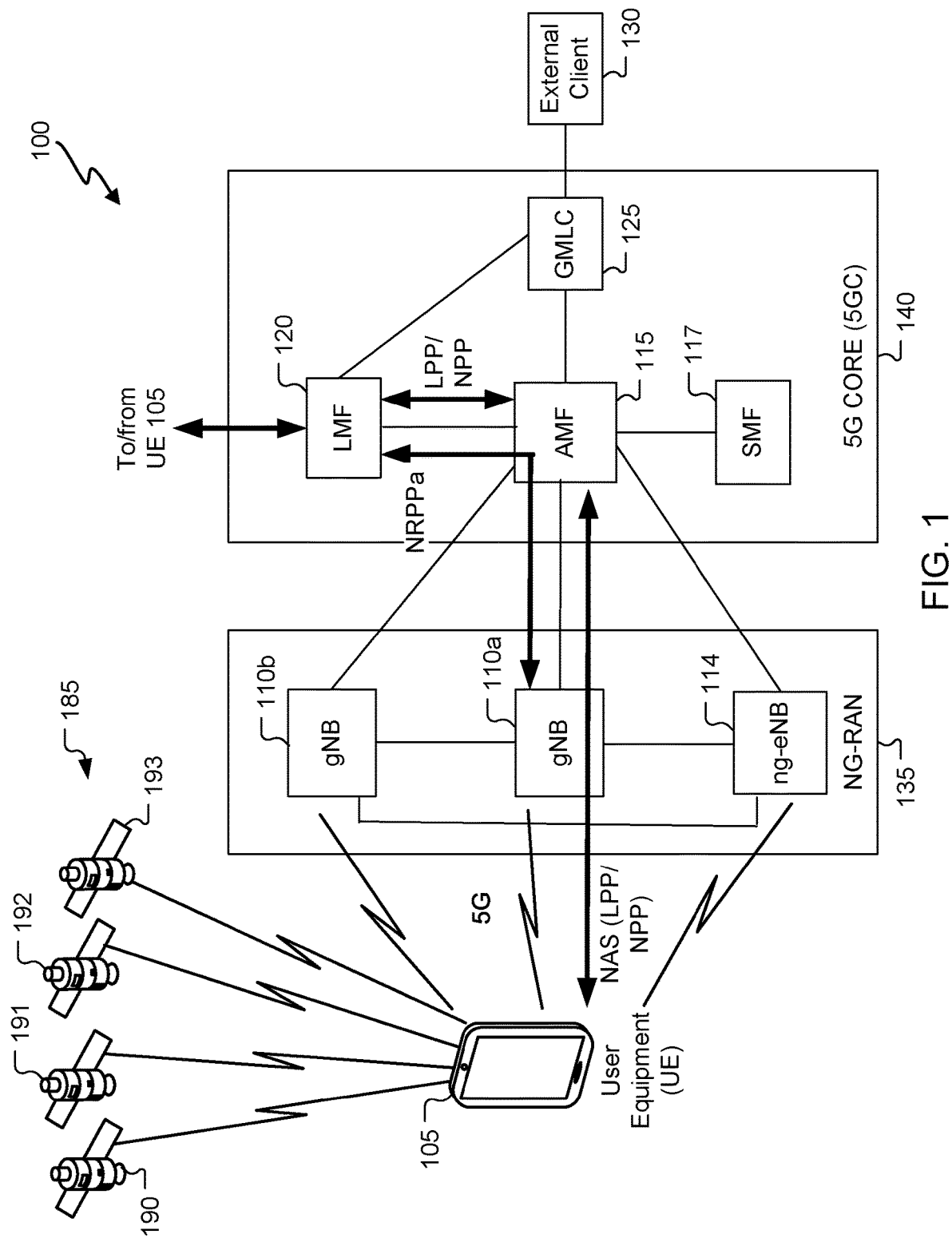
FIG. 1 is a simplified diagram of an example wireless communications system in accordance with the disclosure.

Techniques are discussed herein for determining a location of user equipment. For example, assistance information may be provided to one or more entities such as a user equipment (UE) or a server (e.g., that may adapt a position-determination model). The assistance information may include one or more model parameters, one or more model-parameter updates, and/or one or more feature vectors. The feature vectors may include signal measurements (i.e., values of measurements of one or more signals) and corresponding locations (e.g., the locations of a UE when signals are received from which the signal measurements are made). The entity(ies) may use model-parameter updates to adjust parameters of an existing model. The entity(ies) may use feature vectors to train the position-determination model, e.g., to establish a model or to adjust one or more model parameters of an existing model. The assistance information may be transferred over various interfaces, e.g., between UEs through one or more sidelinks, between a UE and a base station (e.g., a gNB via a Uu interface (also known as an N1 interface)), and/or between a base station and another network entity over, e.g., an N2 interface. Any of the entities may send a request for the assistance information. The request may directly request assistance information, and may indicate one or more position-determination techniques for which assistance information is requested. The request may include a request feature vector of signal measurements which may implicitly indicate a request for assistance data corresponding to the signal measurements, e.g., a request for feature vectors including signal measurements for the same measurements as in the request feature vector or for signal measurements corresponding a position-determination technique associated with the signal measurements in the request feature vector. The position-determination model may be associated with a coarse location of a UE, and a UE may use the position-determination model to determine a location of the UE based on one or more positioning measurements. Other examples may be used.

Items and/or techniques described herein may provide one or more of the following capabilities, as well as other capabilities not mentioned. For example, new position-use cases may be enabled. Improved performance of existing-use cases may be enabled. Scalability of UE position determination may be improved. Operational range of UE position determination may be improved. UE position (i.e., location) may be determined with low uplink communication overhead. UE position may be determined with low latency. UE position may be determined with very little effect on communication protocol standard specifications. UE position may be determined by the UE using measurements already taken according to a communication protocol standard. UE position may be determined with one or more techniques having parity with RAT-independent UE-based features. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS).

Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115.

The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 100b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications.

In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the UE 105's location) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or hte ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
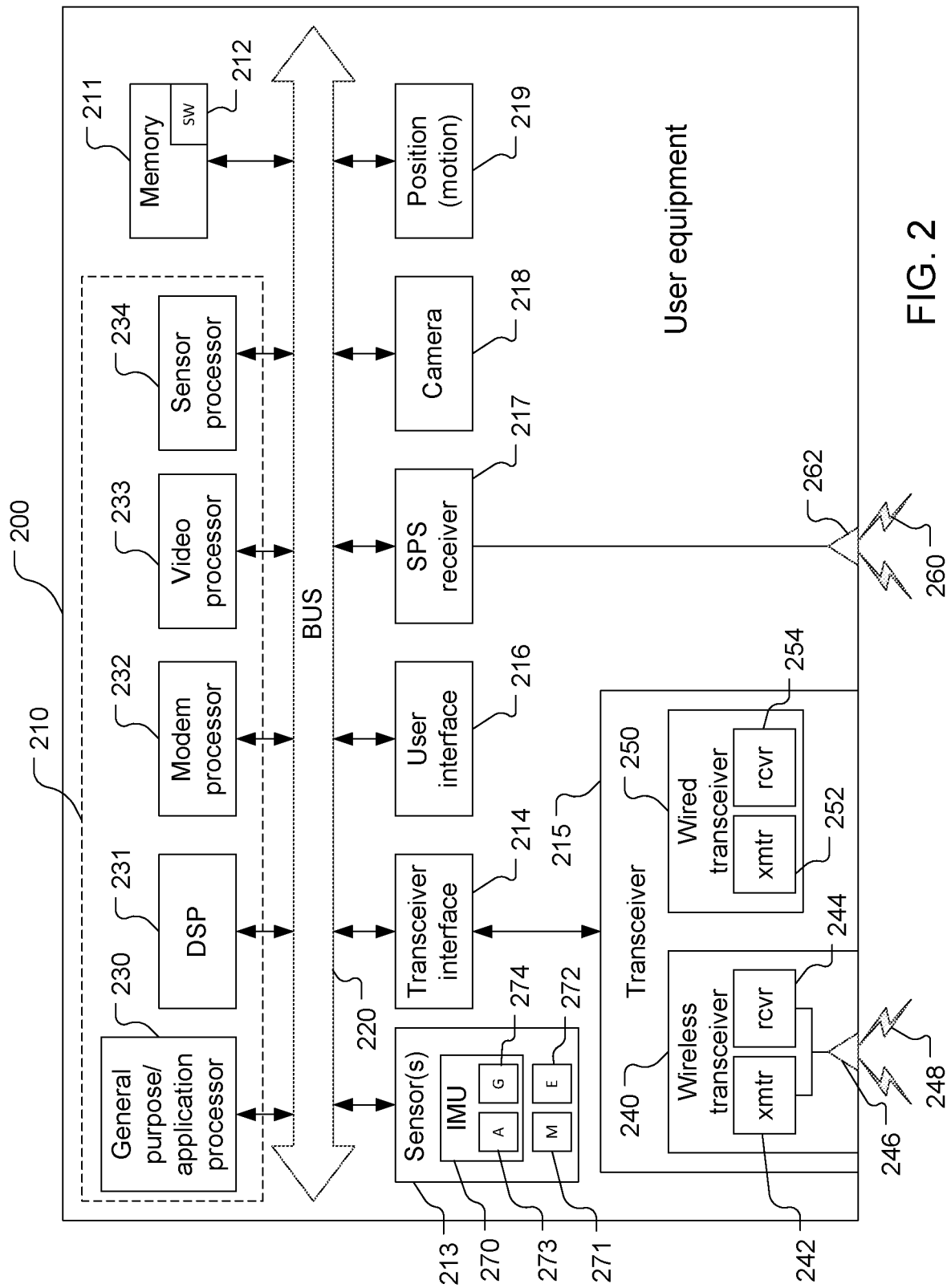
FIG. 2 is a block diagram of components of an example of a user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the PD 219 may be communicatively coupled to each other by a bus 220 (which may be configured, e.g., for optical and/or electrical communication). One or more of the shown apparatus (e.g., the camera 218, the PD 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the server 120 regarding the mobility of the UE 200. For example, based on the information obtained/measured by the sensor(s) 213, the UE 200 may notify/report to the server 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and/or a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels) and/or receiving (e.g., on one or more downlink channels) wireless signals 248 and transducing signals from the wireless signals 248 to wired (e.g., electrical and/or optical) signals and from wired signals to the wireless signals 248. The wireless transceiver 240 may be configured for wireless communication to send communications to, and receive communications from, a variety of entities such as other UEs, base stations, etc. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position and possibly motion of the UE 200. For example, the PD 219 may communicate with, and/or include some or all of, the SPS receiver 217. The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
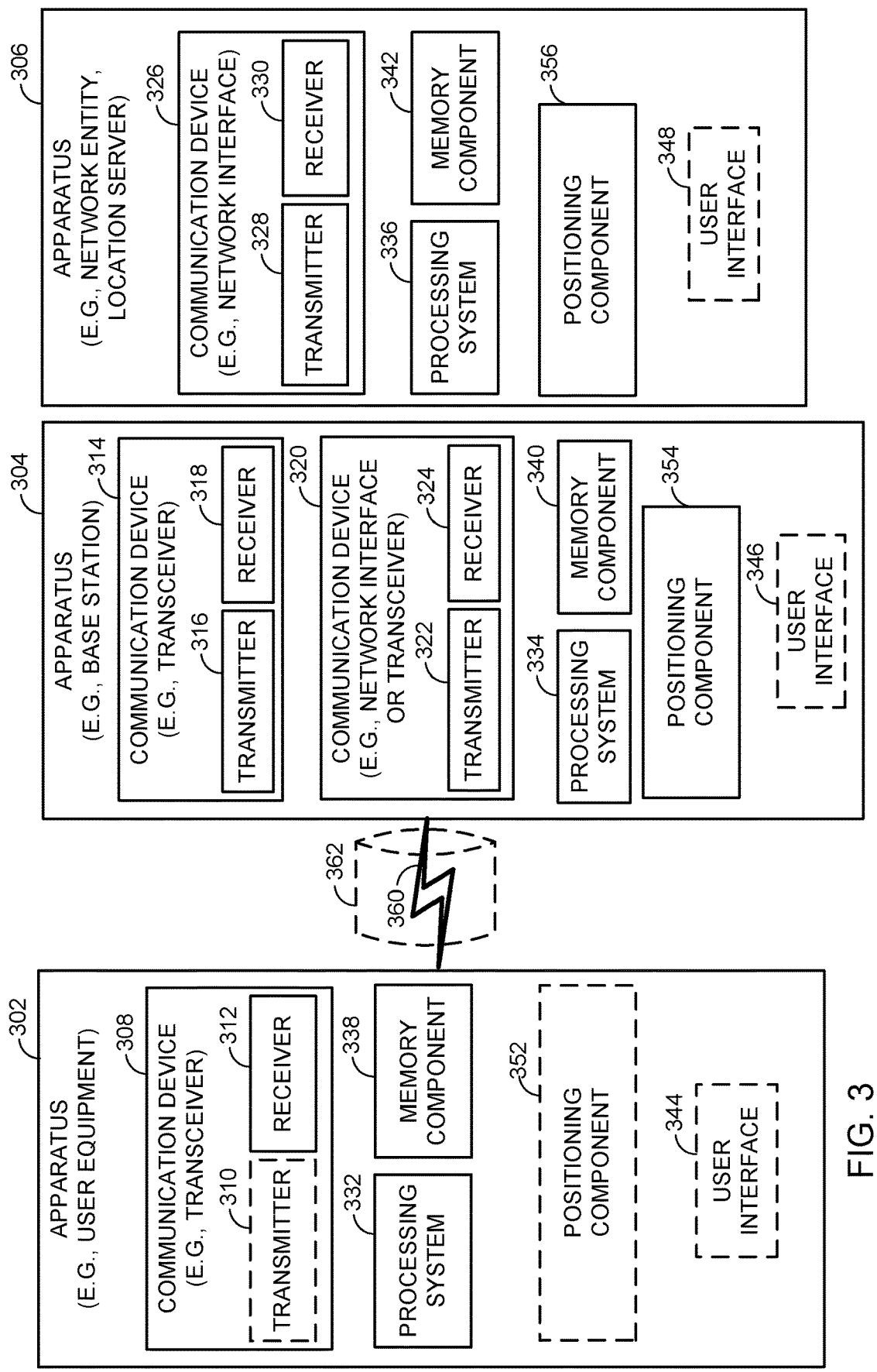
FIG. 3 is a simplified block diagram of several sample aspects of components that may be employed in wireless communication nodes and configured to support communication in accordance with one or more aspects of the disclosure.

Referring to FIG. 3, with further reference to FIGS. 1 and 2, an apparatus 302, an apparatus 304, and an apparatus 306 include sample components shown (represented by corresponding blocks). The apparatus 302, 304, 306 correspond to, for example, a UE, a base station (e.g., eNB, gNB), and a network entity or location server, respectively, to support the operations as disclosed herein. As an example, the apparatus 302 may correspond to the UE 200, the apparatus 304 may correspond to the gNB 110a, 110b and/or the eNB 114, and the apparatus 306 may correspond to the location server 120 (e.g., a Location Management Function (LMF), an Enhanced Serving Mobile Location Center (eSMLC), a Secure User Plane (SUPL) Location Platform (SLP), etc.) or to the Gateway Mobile Location Center (GMLC) 125. The components may be implemented in different types of apparatuses in different implementations (e.g., in an ASIC, in a System-on-Chip (SoC), etc.). The illustrated components may be incorporated into other apparatuses in a communication system. For example, other apparatuses in a system may include components similar to those described to provide similar functionality. A given apparatus may contain one or more of the components. For example, an apparatus may include multiple transceiver components that enable the apparatus to operate on multiple carriers and/or communicate via different technologies.

The apparatus 302 may be an example of the UE 200 shown in FIG. 2. For example, the communication device 308 may comprise the wireless transceiver 240, the processing system 332 may comprise one or more components of the processor 210, the memory component 338 may comprise the memory 211, the positioning component 352 may comprise one or more components of the processor 210 and the memory 211 (and possibly the PD 219), and the user interface 344 may comprise the user interface 216.

The apparatus 302 and the apparatus 304 each may include at least one wireless communication device (represented by communication devices 308 and 314) for communicating with other nodes via at least one designated RAT (e.g., LTE, 5G NR (New Radio)). The communication device 308 may include at least one transmitter (represented by a transmitter 310) for transmitting and encoding signals (e.g., messages, indications, information, and so on) and at least one receiver (represented by a receiver 312) for receiving and decoding signals (e.g., messages, indications, information, pilots, and so on). The transmitter 310 may be omitted (as shown by a dashed box for the transmitter 310 in FIG. 3, although one or more components shown herein, e.g., of the apparatus 302, 304, 306 may be omitted even if not shown in dashed line) from the communication device 308 (e.g., such that the device 308 is the receiver 312 and not a transceiver). The communication device 308 may comprise the wireless transceiver 240 shown in FIG. 2, with the transmitter 310 comprising the transmitter 242 and the receiver 312 comprising the receiver 244. The receiver 312 may also be configured to measure received signals, e.g., wireless signals, to determine signal measurements and/or the processing system 332 may be configured to produce signal measurements, e.g., from signals provided by the receiver. The received signals may be positioning signals (e.g., PRS signals, SPS signals, etc.) or other types of signals, e.g., communication signals. For example, the receiver 312 may be part of the SPS receiver 217 configured to receive and process SPS signals. The transmitter 310 and the receiver 312 may be collectively referred to as a transceiver. The communication device 314 may include at least one transmitter (represented by a transmitter 316) for transmitting signals (e.g., messages, indications, information, pilots, and so on) and at least one receiver (represented by a receiver 318) for receiving signals (e.g., messages, indications, information, and so on). The transmitter 316 and the receiver 318 may be collectively referred to as a transceiver.

A transmitter and a receiver may comprise an integrated device (e.g., embodied as a transmitter circuit and a receiver circuit of a single communication device), may comprise a separate transmitter device and a separate receiver device, or may be embodied in other ways. A transmitter may include a plurality of antennas, such as an antenna array, that permits the respective apparatus to perform transmit "beamforming" as described further herein. Similarly, a receiver may include a plurality of antennas, such as an antenna array, that permits the respective apparatus to perform receive beamforming as described further herein. The transmitter and receiver may share the same plurality of antennas and may only receive or transmit at a given time, not both at the same time. A wireless communication device (e.g., one of multiple wireless communication devices) of the apparatus 304 may comprise a Network Listen Module (NLM) or the like for performing various measurements.

The apparatus 304 and the apparatus 306 each may include at least one communication device (represented by a communication device 320 and a communication device 326) for communicating with other nodes. For example, the communication device 326 may comprise a network interface (e.g., one or more network access ports) configured to communicate with one or more network entities via a wire-based or wireless backhaul connection. The communication device 326 may be implemented as a transceiver configured to support wire-based or wireless signal communication. This communication may involve, for example, sending and receiving messages, parameters, or other types of information. In the example of FIG. 3, the communication device 326 comprises a transmitter 328 and a receiver 330 (e.g., network access ports for transmitting and receiving). The transmitter 328 and the receiver 330 may be collectively referred to as a transceiver. The communication device 320 may comprise a network interface that is configured to communicate with one or more network entities via a wire-based and/or a wireless backhaul. As with the communication device 326, the communication device 320 is shown comprising a transmitter 322 and a receiver 324, which may be collectively referred to as a transceiver.

One or more of the apparatuses 302, 304, 306 may include one or more other components used in conjunction with the operations as disclosed herein. For example, the apparatus 302 may include a processing system 332 for providing functionality relating to, for example, RTT measurements in a licensed or unlicensed frequency band as disclosed herein and/or for providing other processing functionality. The apparatus 304 may include a processing system 334 for providing functionality relating to, for example, RTT measurements in a licensed or unlicensed frequency band as disclosed herein and/or for providing other processing functionality. The apparatus 306 may include a processing system 336 for providing functionality relating to, for example, RTT measurements in a licensed or unlicensed frequency band as disclosed herein and/or for providing other processing functionality. Each of the processing systems 332, 334, 336 may be referred to as a processor, and may include, for example, one or more general purpose processors, multi-core processors, ASICs, digital signal processors (DSPs), field programmable gate arrays (FPGA), or one or more other programmable logic devices or processing circuitry.

The apparatuses 302, 304, and 306 may include memory components 338, 340, and 342 (e.g., each including a memory device), respectively, for maintaining information (e.g., information indicative of reserved resources, thresholds, parameters, and so on). The memories 338, 340, 342 may comprise non-transitory, processor-readable storage mediums storing processor-readable instructions that are configured to cause (e.g., may be executed (after compilation as appropriate) to cause) the processors 332, 334, 336 to perform functions discussed herein. The apparatuses 302, 304, and 306 may optionally include user interface devices 344, 346, and 348, respectively, for providing indications (e.g., audible and/or visual indications) to a user and/or for receiving user input (e.g., upon user actuation of a sensing device such as a keypad, a touch screen, a microphone, and so on).

For convenience, the apparatuses 302, 304, and/or 306 are shown in FIG. 3 as including various components that may be configured according to various examples described herein. The illustrated blocks may, however, have different functionality in different designs.

Components of FIG. 3 may be implemented in various ways. For example, components of FIG. 3 may be implemented in one or more circuits such as, for example, one or more processors and/or one or more ASICs (which may include one or more processors). Each circuit may use and/or incorporate at least one memory component for storing information or executable code (including instructions) used by the circuit to provide desired functionality. For example, at least some of the functionality represented by, and/or discussed with respect to, blocks 308, 332, 338, and 344 may be implemented by processor and/or memory component(s) of the apparatus 302 (e.g., by execution of appropriate code and/or by appropriate configuration of processor components). Similarly, at least some of the functionality represented by blocks 314, 320, 334, 340, and 346 may be implemented by processor and memory component(s) of the apparatus 304 (e.g., by execution of appropriate code and/or by appropriate configuration of processor components). Similarly, at least some of the functionality represented by blocks 326, 336, 342, and 348 may be implemented by processor and memory component(s) of the apparatus 306 (e.g., by execution of appropriate code and/or by appropriate configuration of processor components).

The apparatus 304 may correspond to a "small cell" or a Home gNodeB. The apparatus 302 may transmit and receive messages via a wireless link 360 with the apparatus 304, the messages including information related to various types of communication (e.g., voice, data, multimedia services, associated control signaling, etc.). The wireless link 360 may operate over a communication medium of interest, shown by way of example in FIG. 3 as a medium 362, which may be shared with other communication links as well as other RATs. A medium of this type may be composed of one or more of frequency, time, and/or space communication resources (e.g., encompassing one or more channels across one or more carriers) associated with communication between one or more transmitter/receiver pairs, such as the apparatus 304 and the apparatus 302 for the medium 362.

As a particular example, the medium 362 may correspond to at least a portion of an unlicensed frequency band shared with another RAN and/or one or more APs and/or one or more UEs. The apparatus 302 and the apparatus 304 may operate via the wireless link 360 according to one or more radio access types, such as LTE, LTE-U, or 5G NR, depending on the network in which they are deployed. These networks may include, for example, different variants of CDMA networks (e.g., LTE networks, 5G NR networks, etc.), TDMA networks, FDMA networks, Orthogonal FDMA (OFDMA) networks, Single-Carrier FDMA (SC-FDMA) networks, and so on. Although different licensed frequency bands have been reserved for wireless communications (e.g., by a government entity such as the Federal Communications Commission (FCC) in the United States), certain communication networks, in particular those employing small-cell base stations, have extended operation into unlicensed frequency bands, such as the Unlicensed National Information Infrastructure (U-NII) band used by WLAN technologies, most notably IEEE 802.11x WLAN technologies generally referred to as "Wi-Fi," and LTE in unlicensed spectrum technologies generally referred to as "LTE-U" or "MuLTEFire."

The apparatus 302 may optionally include a positioning component 352, that may be implemented by the processing system 332 and that may be used to obtain location-related measurements of signals (e.g., OTDOA, RTT, etc.) transmitted by a base station or AP (e.g., the gNB 222 or the eNB 224) according to techniques described herein. Location-related measurements may include measurements of signal propagation time or RTT between a UE (e.g., the UE 104 or the UE 240) and a base station or AP (e.g., the base station 102, the small-cell base station 102', the gNB 222, the eNB 224, etc.). The apparatus 302 may send measurement information to the apparatus 306, e.g., directly or via the apparatus 304.

The apparatus 306 may store and/or process measurement information received from the apparatus 302 (and/or other apparatus 302). For example, the apparatus 306 may aggregate measurement information from one or more of the apparatus 302 and send some or all of the aggregated information to one or more of the apparatus 302 (even to apparatus 302 that did not provide measurement information). As another example, the apparatus may send a subset of the aggregated measurement information, e.g., the portion of the aggregated measurement information that is most relevant to the receiving apparatus 302 (e.g., based on capabilities of the apparatus 302, location, time, etc.). As another example, the apparatus 306 may process the measurement information and/or the aggregated measurement information. For example, the apparatus 306 may process the (aggregated) measurement information to determine a machine-learning classifier to enable the apparatus 306 to predict the content of a feature vector, e.g., based on capabilities of an apparatus 302, time, date, etc. As another example, the apparatus 306 may process the (aggregated) measurement information to determine various mathematical results such as averages, standard deviation, etc. The apparatus 306 may group the (aggregated) measurement information based on various criteria, e.g., capabilities of apparatus 302, time, day, etc. before processing.

The apparatus 304, 306 may include positioning components 354, 356, respectively, which may be used to determine a location estimate for a UE 104 (e.g., the apparatus 302), according to techniques described herein, based on location-related measurements provided by the UE 104 and/or by a base station or AP, such as any of the base stations 102, 102'. Location-related measurements obtained by the UE 104 may include measurements of signal propagation time or RTT between the UE 104 and a base station or AP, such as any of such as any of the base stations 102, 102'. Location-related measurements obtained by a base station or AP such as any of the base stations 102, 102' (e.g., apparatus 304) may include measurements of signal propagation time or RTT between the UE 104 and the base station or AP.

A position estimate (e.g., for the UE 104) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other description of a location. A position estimate may be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

One or more of many different positioning techniques (also called positioning methods) may be used to determine position of an entity such as one of the UEs 105. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT, multiple ranges from one entity to other entities and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station (e.g., the base station 102) instructs the UE (e.g., the UE 104) to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., the location server 230 such as a Location Management Function (LMF)). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, UL-PRS) to the one or more base stations (e.g., when instructed by its serving base station) and may include the time difference $T_{Rx \to Tx}$ (or UE $T_{RX-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Rx \to Tx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 104 from the location of a base station 102). The intersection of the two directions at or near the point (x, y) can provide another estimate of the location for the UE 504.

Referring to FIG. 4, a table 400 shows DL/UL reference signals 402 and UE measurements 404 associated with various position-determination techniques 406. Different positioning techniques may benefit from different signal measurements by a UE and/or by a base station such as a gNB. As shown in the table 400, a DL PRS signal may be measured by the UE 104 to determine a DL RSTD (reference signal time difference) measurement to support a DL-TDOA positioning technique. A DL PRS may be measured by the UE 104 to determine a DL PRS RSTD measurement to support a DL-TDOA technique, a DL-AoD technique, and/or a multi-RTT technique. A DL PRS may be measured by the UE 104 to determine a user equipment receive-transmit time difference (UE Rx-Tx) measurement to support a multi-RTT technique. The UE Rx-Tx is the time difference between the time of arrival (ToA) of the PRS at the UE 104 (e.g., at an antenna connector at the UE 104) and the time of departure (ToD) of a corresponding response signal sent by the UE 104 (e.g., at the antenna connector). An SSB (synchronization signal block) signal or a CSI-RS (channel state information-reference signal) for RRM (radio resource management) may be measured by the UE 104 to determine an SS-RSRP (synchronization signal-reference signal receive power) (i.e., RSRP for RRM) measurement, an SS-RSRQ (SS-reference signal receive quality) for RRM measurement (e.g., signal-to-noise ratio (SNR)), a CSI-RSRP for RRM measurement, a CSI-RSRQ for RRM measurement, and/or an SS-RSRPB (SS-RSRP per branch) measurement to support an E-CID positioning technique.

The apparatus 302 and the apparatus 306, and/or the apparatus 302 and other similar apparatus 302, may be configured to provide a federated learning system to assist the apparatus 302 in determining a location of the apparatus 302. Examples are discussed herein with the apparatus 302 being a UE, and the apparatus 306 being a location server, e.g., an LMF, but one or more examples may be applicable to other examples of the apparatus 302, 306. For example, the UE 302 and the LMF 306 may combine to provide the UE 302 with assistance information for the UE 302 to use for UE-based position determination. Also or alternatively, the UE 302 and one or more other UEs may combine to provide the UE 302 with assistance information for the UE 302 to use for UE-based position determination. The assistance information may be provided to the UE 302 while inhibiting confidential information from one device being provided to another device that is not authorized to receive the confidential information. For example, measurement data and associated locations may be provided to the UE 302 while confidential data, if any, are kept from the UE 302.

Figure 5:
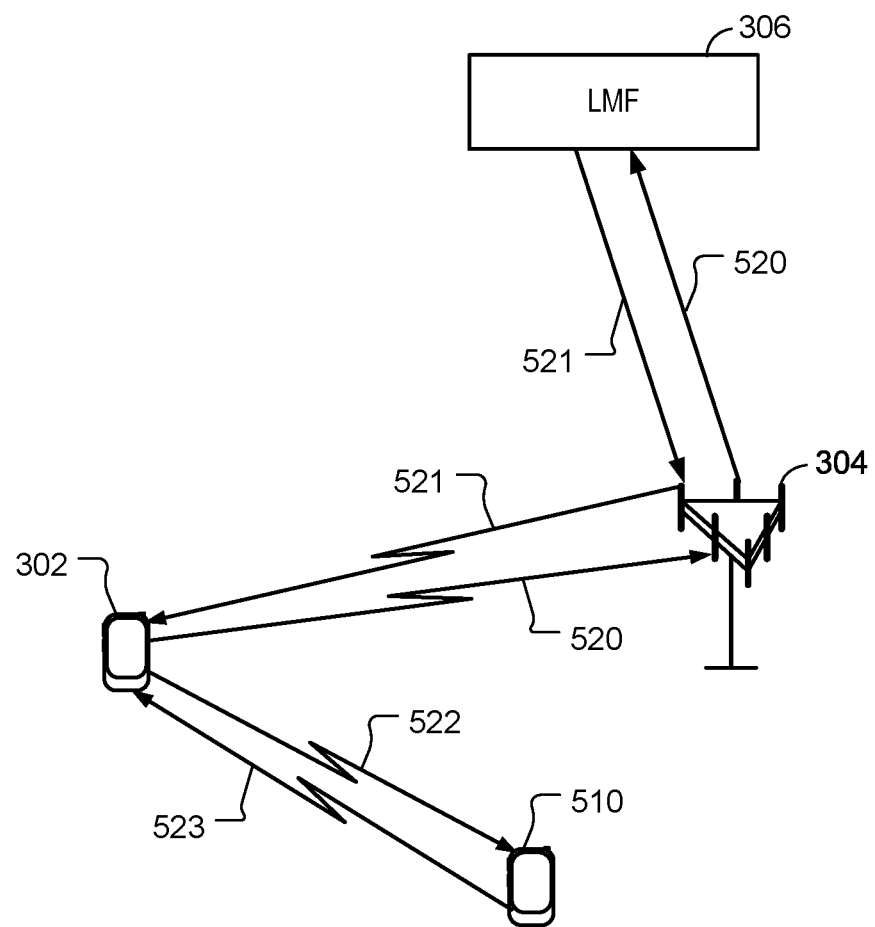
FIG. 5 is a simplified diagram of assistance data requests and assistance data provisioning.

Referring to FIG. 5, with further reference to FIGS. 1-4, the UE 302 may be configured to send a request 520 to the base station 304 and/or to send a request 522 to a UE 510 for assistance data that the UE 302 may use for UE-based location determination to determine a location of the UE 302. The UE 510 may be configured similarly to the UE 302. A location server such as the LMF 306 may be configured to configure the UE 302, e.g., using positioning measurement configuration communications, to send a positioning feature vector to the LMF 306. The LMF 306 may be configured to use this vector to determine a position of the UE 302 (e.g., as part of UE-assisted positioning) and/or as a request for assistance data. The assistance data may be used by the UE 302 to establish or adapt, depending on the assistance data received, a position-determination model. The UE 302 may use one or more signal measurements taken at the UE 302 in the position-determination model to determine the position (location) of the UE 302 corresponding to where the signals were measured.

Figure 6:
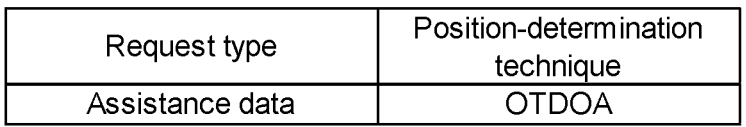
Figure 7:
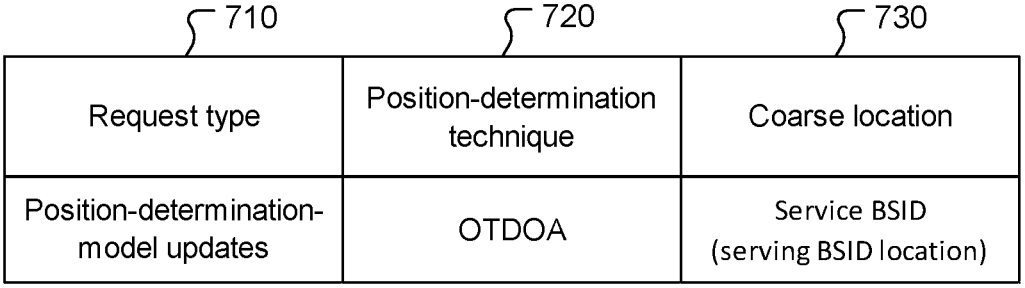

Referring also to FIGS. 6-8, the UE 302 may be configured to send the requests 520, 522 in a variety of formats and/or with a variety of information. For example, the UE 302 may send a request 600 directly specifying that the UE 302 wants assistance data for UE-based location determination, e.g., with the request 600 specifying a position-determination technique such as OTDOA (in this example), multi-RTT, etc. The specified position-determination technique will likely be a technique that the UE 302 is configured to use to determine the location of the UE 302. Also or alternatively, the request could directly specify which feature vector contents (e.g., signal measurements) the UE 302 wants. Such forms of requests may reduce or eliminate interpretation by the LMF 306. The request 600 may not have fields of "Request type" or "Position-determination technique" indicated as shown, but simply have the information "Assistance data" and "OTDOA" in appropriate fields of a communication associated with the field types. As another example, the UE 302 may send a request 700 directly asking for a position-determination model and/or position-determination-model updates (as in the example shown), e.g., with the request 700 indicating a request type 710 of "position-determination model" or "position-determination-model updates" and a corresponding position-determination technique 720. The request 700 may include a coarse location 730 of the UE 302, i.e., an indication of a coarse location of the UE 302 or information from which a coarse location may be derived. For example, the coarse location 730 may include coordinates, or a base station ID (BSID) such as a serving BSID (of a base station presently providing communication service to the UE 302) or a BSID of another base station within communication range of the UE 302 (e.g., in a neighbor list), or location of a base station such as the location of the serving base station. The format of the request 520 may differ from the format of the request 522, and the formats of the requests 520, 522 may depend on the recipient (e.g., a base station vs. a UE) of the request 520, 522. For example, the request 522 may not request a position-determination model or position-determination-model updates. Also or alternatively, the request 522 may not include a coarse location of the UE 302 (e.g., because the coarse location may be assumed because the UE 302 is within communication range of the UE 510). Also or alternatively, the request 520, 522 may indirectly (e.g., implicitly) request the assistance data. For example, the request 520, 522 may contain a feature vector of one or more signal measurements. For example, the request 520, 522 may include Channel Energy Response (CER) information, RSRP information, RSSI information, Transmission/Reception Point (TRP) IDs, etc. The TRPs may be entities in the system 100, such as UEs or base stations. The signal measurement(s) contained in the request 520, 522 may be associated with a particular position-determination technique. Thus, the feature vector may implicitly request assistance data for that position-determination technique (including, for example, signal measurement(s) associated with the position-determination technique including the signal measurement(s) in the request and possibly one or more signal measurements in addition to the signal measurement(s) in the request). The signal measurement(s) may be an implicit request for assistance data containing signal measurement(s) (along with corresponding location(s)) from one or more other UEs (such as the UE 510) that is(are) the same as the signal measurement(s) in the request 520, 522 (e.g., regardless of whether the signal measurement(s) in the request 520, 522 is(are) associated with one or more particular position-determination techniques). The discussion herein sometimes refers to the requests 520, 522 in the singular (the request 520, 522) even though the requests 520, 522 may not be identical. Similarly, the discussion herein sometimes refers to responses 521, 523 in the singular (the response 521, 523) even though the responses 521, 523 may not be identical.

A request, such as an example request 800 shown in FIG. 8, in the form of a feature vector may have a format of a typical measurement report, e.g., in accordance with an existing communication protocol such as NR Release 16. In this example, the request 800 comprises an RSTD vector that includes a reference TRP ID field 810, a neighboring TRP ID field 811, a PRS field 812, a UE Rx-Tx field 813, an RSRP field 814, a time difference of arrival (TDOA) field 815, a quality metrics field 816, and a geographic region field 817. The ID fields 810, 811 provide identities of reference and neighbor TRPs. The PRS field 812 indicates a PRS resource pair or PRS resource set pair, of the reference and neighbor TRPs, measured to determine the values of the fields 813-816. The RSRP field 814 indicates the received power of the reference signal. The TDOA field 815 indicates the TDOA of the PRS signals from the reference and neighbor TRPs. The quality metrics field 816 includes quality metrics of timing measurements (e.g., TDOA) including an uncertainty sub-field 820, a resolution sub-field 821, and a measurements sub-field 822. The uncertainty sub-field 820 specifies an estimate of uncertainty of the measurement. The resolution sub-field 821 specifies a resolution level of the uncertainty sub-field 820. The measurements sub-field 822 specifies the measurements used to determine the quality metrics. The geographic region is optional and may include, for example, an estimated (rough) location of the UE 302 and a radius. Other configurations of geographic regions may be used. For example, the UE 302 may be configured to send an indication of a building in which the UE 302 is presently in order to request assistance data for the building (e.g., different assistance data for each floor of the building) Here, the geographic region is given as a geographic location in latitude and longitude, and a radius value. The geographic region may include the geographic location but not the radius. As there may be multiple PRS resource pairs or PRS resource set pairs, the request 800 may include multiple instances of the fields 810-817, in this example, three instances of each of the fields 810-817. Other quantities (e.g., one, two, more than three) of instances of the fields 810-817 are possible. The UE Rx-Tx value may be designated by an interval number, e.g., T102 being the $102^{nd}$ interval in a set of available time intervals. Similarly, the TDOA and uncertainty values may be specified by interval numbers. The uncertainties may correspond to ranges of time such as +1-Tmax where Tmax is an amount of time corresponding to the uncertainty value (e.g., V011).

The request 520, 522 from the UE 302 may be conveyed as an RRC (Radio Resource Control) message encapsulating an LPP (LTE Positioning Protocol) message including a RequestAssistanceData message body. The base station 304 may remove the RRC encapsulation before sending the response 520 to the LMF 306. The RequestAssistanceData message body in an LPP message may be used by the UE 302 to request assistance data from the LMF 306, or from the UE 510. For example, the UE 302 may be configured to request the assistance data in a format of "other UE's measurements and their locations" based on different positioning methods that the UE 302 is configured to employ. For example, the UE 302 may be configured to use OTDOA, multi-RTT, DL-AoD or other technique, and may be configured to ask for measurements (e.g., feature vectors) related to (e.g., that enable position determination using) one or more of these techniques and that have been gathered at the LMF 306. For example, the UE 302 may be configured to produce and send a RequestAssistanceData message body of:

```
[[
nr-otdoa-RequestAssistanceData-r16    NR-OTDOA-RequestAssistanceData-r16    OPTIONAL,
nr-mrtt-RequestAssistanceData-r16     NR-MRTT-RequestAssistanceData-r16     OPTIONAL,
nr-aod-RequestAssistanceData-r16      NR-AOD-RequestAssistanceData-r16      OPTIONAL,
[[
``` to request assistance data for OTDOA, multi-RTT, and DL-AoD techniques.

The UE 302 may send the request 520, 522 to the LMF 306, or other location server, or to one or more other UEs, e.g., the UE 510, as appropriate. For example, the UE 302, e.g., the processor 332, may be configured to send the request 520 in a UL signal on a UL channel via the transceiver 308, and in particular the transmitter 310 (e.g., using an appropriate RAT portion, such as a cellular portion, of the transmitter 310), to the LMF 306 via the base station 304 (such as a gNB). The UE 302 sends the request 520 to the base station 304 over the Uu interface. The UE 302, e.g., the processor 332, may be configured to send the request 522 in a sidelink signal on a sidelink channel via the transceiver 308, and in particular the transmitter 310, to the UE 510. The UE 302 may be configured to send the request 522 using any appropriate sidelink RAT such as LTE Direct (LTE-D), WiFi Direct (WiFi-D), Bluetooth®, etc. The request 522 thus requests assistance data from UEs in the vicinity of the UE 302.

The LMF 306 is configured to analyze the request 520 and to send a response 521 with appropriate assistance data. The LMF 306 may receive feature vectors (including signal measurements) from numerous UEs, e.g., that the UEs send to the LMF 306 in order for the LMF 306 to determine the location of the UE as part of a UE-assisted positioning technique. The information sent by the UEs to the LMF 306 may be signal measurements that the UEs provide in accordance with an existing protocol such that additional information need not be provided by the UEs to enable the techniques discussed herein. Thus, signal measurements used for UE-assisted (e.g., LMF determined) position determination may be used as discussed herein for UE-based position determination. The UE-assisted position determination may use one or more base station signals, one or more SPS signals, and/or heatmap information, etc. to determine the UE location. The LMF 306 may determine the locations of the UEs and store the feature vectors in the memory 342 along with the respective locations. The LMF 306 may be configured to store only feature vectors that the LMF 306 determines to be of high quality, e.g., that correspond to signals received with at least a threshold power and/or that correspond to timing measurements of at least a threshold quality (e.g., with no more than a threshold level of uncertainty), etc. The LMF 306 may receive feature vectors that include respective locations, e.g., that the UEs determined themselves, e.g., using assistance data as discussed herein, using SPS signals and techniques, using a heatmap in conjunction with signal measurements, using trilateration without assistance data discussed herein, etc. The LMF 306 may determine positioning-model parameters (e.g., train a position determination model) and/or positioning-model-parameter updates, e.g., using the feature vectors from the UEs to train a position-determination model, and store the parameters and/or the parameter updates. While the discussion refers to the LMF 306, these functions may be performed by another type of entity, e.g., a generic server, an OEM server, an operating system server, etc. The LMF 306 may use the feature vectors, the model parameters, and/or the model parameter updates to send the assistance data to the UE 302, e.g., via the base station 304, in the response 521 in a DL signal on a DL channel in response to the request from the UE 302. For example, the LMF 306 may aggregate (and possibly process) measurements from the UE(s) and send the aggregated/processed information, or a subset thereof (e.g., the information that may be more relevant to the UE 302 than other information) to the UE 302 and/or one or more other UEs. Similarly, the UE 510 is configured to analyze the request 522 and send a response 523 to the UE 302 via a sidelink channel.

The contents of the response 521, 523 may correspond to the requested assistance data from the request 520, 522. For example, the response 521, 523 may include one or more feature vectors with the same signal measurements as those in the request 520, 522. Also or alternatively, the response 521, 523 may include signal measurements corresponding to a position-determination technique indicated (directly or indirectly) by the corresponding request 520, 522. Thus, the response 521, 523 may include signal measurements not included in the request 521, 523. The feature vectors of the response 521, 523 may include CER information, RSTD information, RSRP information, etc., along with corresponding locations. Also or alternatively, the response 521, 523 may include a position-determination model and/or position-determination-model updates (e.g., model parameters or model parameter updates) corresponding to a position-determination technique indicated (directly or indirectly) by the request 520, 522. For the response 523 from the UE 510 in the form of one or more feature vectors and one or more corresponding locations, the location(s) may be determined by the LMF 306 and provided to the UE 510 and/or may be determined by the UE 510, e.g., using assistance data as discussed herein, using SPS signals and techniques, using a heatmap in conjunction with signal measurements, using trilateration without assistance data discussed herein, etc.

The contents of the response 521, 523 may correspond to the coarse location of the UE 302, e.g., as indicated by the request 520, 522. For example, one or more feature vectors and/or a position-determination model and/or one or more position-determination model updates may correspond to the coarse location of the UE 302. This may help improve the accuracy of a location determined using a position-determination model provided by the response 521, 523 or determined (e.g., created or updated) based on the response 521, 523.

Figure 10:
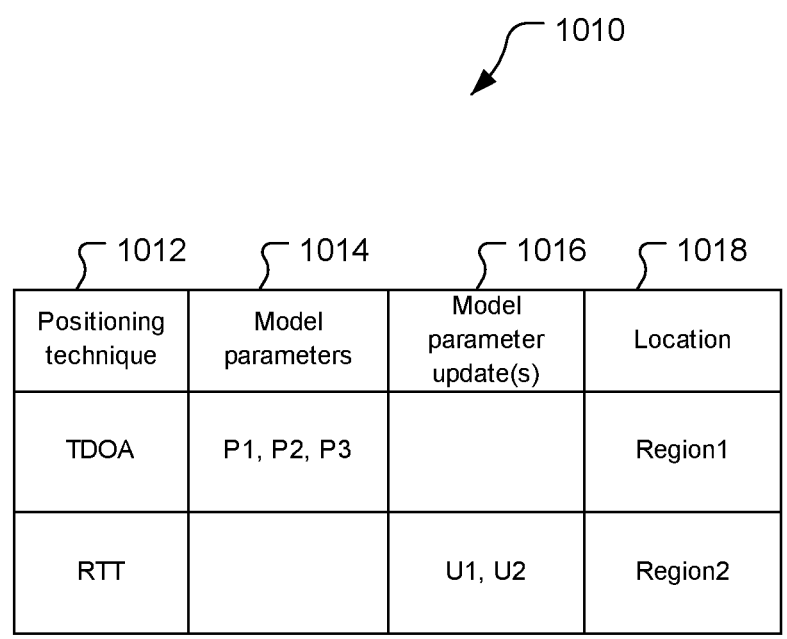

The requested assistance data may take a variety of forms. For example, the assistance data may be a feature vector of signal measurements (i.e., values of parameters of measured signals such as RSSI, SNR, RSRP, RSRQ, RSTD, AoA, AoD, UE Rx-Tx, SPS signal measurements, RAT-independent signal measurements, etc.) and corresponding locations. A corresponding location may be the location at which one or more signals were measured by a UE to determine the signal measurements for a given feature vector (and this location may be referred to as the location of the signal measurements). For example, referring also to FIG. 9, a response 900 may be similar to (i.e., include some of the same types of information as) the request 800. The response 900 includes a location (e.g., a latitude value and a longitude value without a radius value) instead of the geographic region 817 in the request 800. The feature vector may include a location confidence that is a confidence measure for the location corresponding to the signal measurements. The location confidence may be, for example, an uncertainty radius or covariance of the location. The feature vector may be used to train (e.g., establish or adapt) a position-determination model. The model may be a machine-learning model to provide a location based on a set of signal measurements. Also or alternatively, the assistance data may include model parameters (a position determination model) and/or model parameter updates for the position-determination model (i.e., a positioning model). For example, referring also to FIG. 10, a response 1010 includes a positioning technique field 1012, a model parameter(s) field 1014, a model parameter update(s) field 1016, and a location field 1018. Although two positioning techniques are shown in the response 1010, the response 1010 may only include one positioning technique and the corresponding model parameter(s) or the corresponding model parameter update(s). Typically, only the model parameter(s) or only the model parameter update(s) will be provided for a positioning technique. The model parameters may be used in the position-determination model along with appropriate features (e.g., signal measurements) to determine the location of the signal measurements. The provided model parameters may be treated as a recommendation, and modified (e.g., by the UE) before use, or used (e.g., by the UE) to modify another model before use in determining position of the UE. The model parameter updates may be used to alter (adapt) existing model parameters, e.g., stored by a UE. Different locations (i.e., indications of different locations) may be provided corresponding to different entries in the response 1010, or a single location may be provided corresponding to the entire response 1010. In this example, the location field 1018 includes a region (e.g., a point location and a radius, a geometric perimeter, etc.) for each entry (positioning technique and corresponding parameters) in the response 1010.

The response 521, 523 may include a timestamp for the response 521, 523 and/or a timestamp for one or more of the feature vectors individually. The usefulness of a feature vector may change with time, e.g., with older feature vectors being less useful, or at least assumed to be less useful, for training a position-determination model to reflect present conditions accurately. Also or alternatively, the usefulness of a feature vector may depend on the time when measurements were taken for the feature vector relative to a present time. For example, characteristics such as interference may vary depending upon a time of day and/or a day of the week, month, and/or year. The UE 302 may want to discount (e.g., weight less) or ignore (or even discard) feature vectors depending upon the time of the feature vector relative to a present time and/or relative to a time of unreliability, e.g., a time of high interference. The response 521, 523, may include a timestamp as part of the feature vector, as shown in the response 900. The timestamp may, for example, indicate the month, day, and year (mm/dd/yy) and the hour, minute, and second (hh, mm, ss) corresponding to the feature vector (e.g., when the signal(s) was(were) (last) measured for the signal measurements in the feature vector).

The assistance data sent may depend on the UE 302 that requested the assistance data and thus the UE 302 to which the assistance data are sent. For example, the LMF 306 and/or the UE 510 may be configured to select assistance data depending on the position-determination technique and/or depending on the signal measurements in a feature vector of a request and/or depending on the location (e.g., a location estimate such as a cell) of the UE 302. The LMF 306 and/or the UE 510 may be configured to select stored feature vectors with locations within a threshold distance of the location of the UE 302. The LMF 306 and/or the UE 510 may be configured to select stored feature vectors that have the same signal measurements as the request. The LMF 306 and/or the UE 510 may be configured to select stored feature vectors that correspond to the same position-determination technique as a feature vector of the request. The UE 510 may be configured to send a recent (e.g., a most-recently obtained) feature vector and corresponding recently-determined (e.g., most-recently determined) location in the response 523.

Also or alternatively, the LMF 306 and/or the UE 510 may be configured to send assistance data to the UE 302 automatically, e.g., without having received a request for the assistance data from the UE 302. The automatically-provided assistance data may not be tailored, e.g., to a particular geographic region or to a particular position-determination technique. Automatically-provided assistance data may, however, be tailored, e.g., with only feature vectors having locations within a threshold distance of the base station 304 being sent by the LMF 306 to the base station 304 for broadcast to UEs. The assistance data may be tailored (e.g., culled) based on other criteria, e.g., time of day or position-determination technique. For example, the LMF 306 may be configured to send feature vectors for one position-determination technique for broadcast by the base station 304, and then send feature vectors for another position-determination technique for broadcast by the base station 304, etc.

Assistance data may be broadcast or sent point-to-point. For example, assistance data (automatically-provided or provided in response to a request) may be broadcast to any UE within communication range of the broadcaster (e.g., the base station 304 and/or the LMF 306). As another example, the assistance data may be sent point-to-point to a UE 302 (e.g., the requesting UE) from the base station 304 and/or the LMF 306. The assistance data may be sent by whichever technique is advantageous over the other, e.g., being sent point-to-point if the number of UEs within range is below a threshold quantity and being broadcast if the number of UEs within range meets or exceeds the threshold. Alternatively, the assistance data may always be broadcast, or always sent point-to-point, or broadcast sometimes and sent point-to-point others.

The response 521, 523 from the LMF 306 or the UE 510 may be conveyed using LPP and the ProvideLocationInformation field. The ProvideLocationInformation message body in an LPP message may be used by the LMF 306 to provide measurements/feature vectors and position estimates from the LMF 306, or from the UE 510, to the UE 302. For example, the LMF 306 and/or the UE 510 may be configured to send the assistance data in an LPP format. The reporting of the assistance data may be part of a special SIB (system information block) that targets UEs in a specific geographic region. For example, the LMF 306 and/or the UE 510 may be configured to produce and send a ProvideLocationInformation message body of:

```
[[
nr-otdoa-ProvideLocationInformation-r16    NR-OTDOA-ProvideLocationInformation-r16    OPTIONAL,
mrtt-ProvideLocationInformation-r16        MRTT-ProvideLocationInformation-r16        OPTIONAL,
dl-aod-ProvideLocationInformation-r16      DL-AOD-ProvideLocationInformation-r16      OPTIONAL,
[[
``` to provide assistance data for OTDOA, multi-RTT, and DL-AoD techniques. As shown, the assistance data may be segmented, in this example based on the position-determination technique.

The UE 302, e.g., the processor 332, may use one or more of the received feature vectors to train (e.g., establish or update/adapt) a position-determination model. The UE 302 may select a subset of received feature vectors to use to train the position-determination model, e.g., based on content of the feature vectors. For example, the UE 302 may select feature vectors whose indicated locations are in the same geographic area as the UE 302, e.g., within a threshold distance of the UE 302 or a base station connected to the UE 302. As another example, the UE 302 may select feature vectors of TRPs that are in a neighbor list of the UE 302. As another example, the UE 302 may select feature vectors received from the UE 510 (or other UE) via sidelink communication. Feature vectors received via sidelink, e.g., from the UE 510, may be highly-correlated to feature vectors that the UE 302 would obtain and thus particularly useful in training the position-determination model. As another example, the UE 302 may be configured to discount or disregard, or to weigh more strongly, feature vectors based on an age of the feature vector and/or a time of the feature vector relative to a present time (e.g., whether the time of the feature vector is indicative of the feature vector being representative of present conditions for the UE 302). The UE 302 may be configured to use the selected subset to train a position-determination model quickly and then use other feature vectors to refine the position-determination model. Also or alternatively, the UE 302 may be configured to establish or update/adapt the position-determination model using received model parameters or model parameter updates, respectively. The UE 302 may be configured to discard feature vectors and/or model parameter updates once the vectors and/or updates have been used to train the position-determination model.

The UE 302 may be configured to train more than one position-determination model. The UE 302 may use one universal position-determination model or may use multiple position-determination models. For example, different models may be based on different position-determination techniques. As another example, the UE 302 may train different models for different geographic regions (even if the models are for the same position-determination technique). For example, the UE 302 may be configured to train different models for different buildings, or even different regions (e.g., different floors) within the same building. The UE 302 may be configured to select (or request) only feature vectors associated with a particular geographic region in order to train a position-determination model for that geographic region.

The UE 302 may request for the apparatus 306 to train a position-determination model for the UE 302. For example, the UE 302 may send a request to a recipient such as an OEM (Original Equipment Manufacturer) server, an OS (Operating System, e.g., Android or iOS) server, a training server, a generic processing server, etc. for the recipient to train a position-determination model and send the model to the UE 302. The UE 302 may negotiate with the recipient regarding characteristics of the training, e.g., processing time, (maximum) number of epochs to be used for training, etc.

The UE 302 (e.g., the processor 332) may be configured to use one or more signal measurements currently obtained by the UE 302, previously obtained and stored by the UE 302, and/or provided by one or more other UEs, in the position-determination model to determine the position (location) of the UE 302. The UE 302 may be configured to measure one or more signals to determine signal measurements appropriate for a position-determination model, and to use one or more of these signal measurements in the model to determine the location of the UE 302. The UE 302 may be configured to use one or more provided signal measurements in the model, with the provided signal measurements contained in one or more feature vectors received by the UE 302 that were taken by one or more other UEs, e.g., where the location(s) associated with the feature vector(s) is(are) near the present location of the UE 302. For example, the UE 302 may be configured to use one or more signal measurements in a feature vector from the UE 510 where the feature vector is obtained by the UE 302 in a sidelink communication. The UE 302 may use provided measurements obtained nearby and only measure missing measurements. The UE 302 may be configured to use one or more of the provided measurements even if the UE 302 has made the same measurement(s), and may be configured to use one or more provided measurements while not using one or more other provided measurements. Also or alternatively, the UE 302 may combine one or more provided measurements with one or more corresponding measurements made by the UE 302, e.g., by averaging the measurements. For example, a smartphone that has significant functionality and battery power may measure signals and determine signal measurements and a watch that is close to the smartphone may use some or all of the signal measurements from the smartphone and a small number of measurements made by the watch to determine the location of the watch. By using one or more signal measurements from one or more received feature vectors, the UE 302 may reduce time and/or cost (e.g., processing power and/or energy) for the UE 302 to make the signal measurements and/or may improve accuracy of the measurement(s). The UE 302 may be configured to use signal measurements obtained by the UE 302 (e.g.,
from the receiver 312) in the position-determination model to determine a location of the UE 302.

Figure 11:
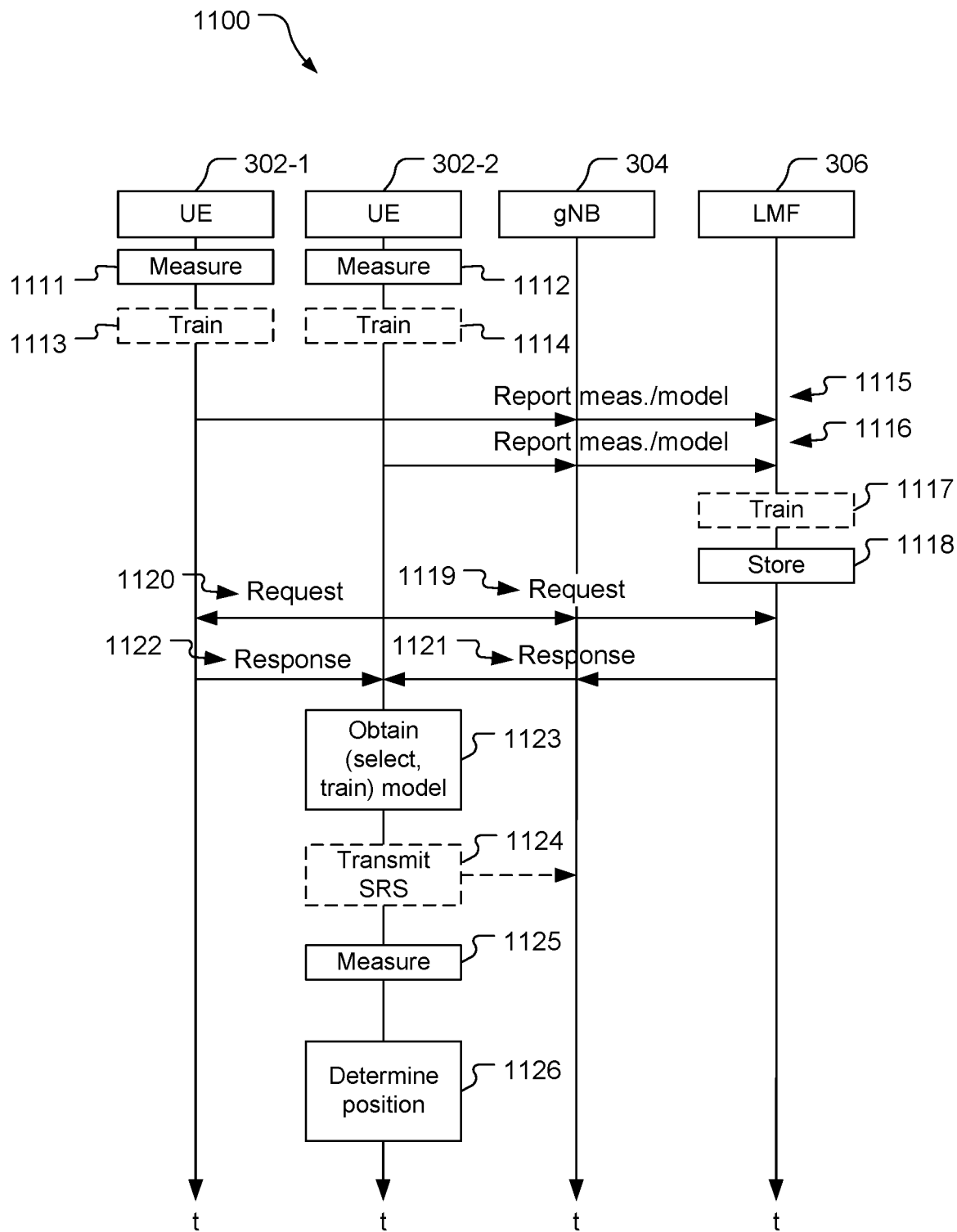
FIG. 11 is a signal and operation flow diagram of signaling between, and operations of, a UE, a base station, and a server shown in FIG. 3.

Referring also to FIG. 11, an example signal and operation flow 1100 shows signals transferred between, and sample operations of, UEs 302-1, 302-2, the gNB 304, and the LMF 306. The discussion refers to the gNB 304 and the LMF 306 as an example, but other apparatus may be used. While only two UEs 302-1, 302-2 are shown in FIG. 11, other quantities of (e.g., only one, more than two) UEs may be used. Alterations may be made to the flow 1100, e.g., by having stages rearranged, added, and/or removed.

At stages 1111, 1112, 1113, 1114, 1115, 1116 the UEs 302-1, 302-1 measure signals, optionally train one or more position-determination models, respectively, and report measurements and/or model parameters. At stages 1111, 1112 each the UEs 302-1, 302-2 measure positioning signals for use in determining position of the respective UE 302-1, 302-2 according to one or more position-determination techniques. At stages 1113, 1114 the UEs 302-1, 302-2 may each optionally train one or more position-determination models, e.g., by establishing the model(s) and/or revising one or more existing models (e.g., updating one or more model parameters). The UEs 302-1, 302-2 may modify one or more model parameters before or after using measurement information to train the model(s). At stages 1115, 1116, each of the UEs 302-1, 302-2 report one or more feature vectors of measurements and/or one or more position-determination models and/or one or more position-determination-model parameter updates to the LMF 306 via the gNB 304. The reports are sent to the gNB 304 in RRC-encapsulated LPP messages over Uu interfaces, and sent from the gNB 304 to the LMF 306 in LPP messages.

At stages 1117, 1118, the LMF 306 optionally trains one or more position-determination models and stores appropriate information. At optional stage 1117, the LMF 306 uses one or more feature vectors (measurement information) received from one or more of the UEs 302-1, 302-2 to train (establish or update) one or more corresponding position-determination models. At stage 1118, the LMF 306 stores one or more feature vectors received from the UEs 302-1, 302-2 and/or any position-determination models received from the UEs 302-1, 302-2 and/or any position-determination-model parameter updates received from the UEs 302-1, 302-2. The LMF 306 may be configured to modify one or more model parameters before or after training of a model using the measurement information.

At stages 1119 1120, 1121, 1122, the UE 302-2 sends one or more requests for assistance data and receives one or more corresponding responses with assistance data. The UE 302-2 may send a request for assistance data to the LMF 306 via the gNB 304 (e.g., with the request being an RRC-encapsulated LPP message over the Uu interface to the gNB 304, and an LPP message to the LMF 306). The UE 302-2 may also or alternatively send a request for assistance data over a sidelink to the UE 302-1. Stages 1119, 1120 may be performed concurrently or at different times. At stage 1121, the LMF 306 may respond to receiving the assistance data request at stage 1119 by sending a response with assistance data to the UE 302-2 (e.g., in an LPP message to the gNB 304 and in an RRC-encapsulated LPP messages from the gNB 304 to the UE 302-2) corresponding to the request (e.g., with information useful for the same position-determination model associated with the request). At stage 1122, the UE 302-1 may respond to receiving the assistance data request at stage 1120 by sending a response with assistance data to the UE 302-2 corresponding to the request (e.g., with information useful for the same position-determination model associated with the request). The assistance data from the UE 302-1 and/or the LMF 306 may comprise one or more measurement feature vectors, one or more models (i.e., one or more model parameters for each of one or more position-determination models), and/or one or more model parameter updates for each of one or more models. The response(s) at stage(s) 1121, 1122 may not instruct the UE 302-2 which position-determination method to use, but the assistance data (e.g., the model) in the response(s) may correspond to the method that the UE 302 is going to use in accordance with the request(s) at stage(s) 1119, 1120. The response(s) at stage(s) 1121, 1122 may correspond to a coarse location of the UE 302-2 (e.g., as indicated by the request(s) at stage(s) 1119, 1120 or inferred (e.g., by reception of the request(s) at stage(s) 1119, 1120)).

At stage 1123, the UE 302-2 obtains a position-determination model. The UE 302-2 may read one or more model parameters from the response(s) received from the LMF 306 and/or the UE 302-1 (or other entity(ies), e.g., one or more other UEs). The UE 302-2 may modify one or more model parameters before training or using the model. The UE 302-2 may use the feature vector(s) from the assistance data to train a model (e.g., establish a new model or modify an existing model). The UE 302-2 may modify a trained model (e.g., modify one or more model parameters after training with or without using measurement information).

At stage 1124, the UE 302-2 may optionally transmit one or more UL-SRS for positioning signals (i.e., uplink positioning signals), e.g., as part of RTT positioning. The UE 302-2 may not send uplink positioning signals if the UE 302-2 is not using RTT to determine the location of the UR 302-2. The UE 302-2, e.g., the processing system 332, may be configured to affect transmission of the UL-SRS for positioning signals based on the position-determination model and/or other assistance data obtained at stage 1123. For example, the UE 302-2 may determine a transmit power, a number of antenna ports used, a transmit beam (spatial beam), and/or a digital precoder selection based on the position-determination model. As another example, the UE 302-2 may determine an approximate location of the UE 302-2 as the location indicated in a feature vector whose measurements are similar to a measurement by the UE 302-2 at stage 1112. The UE 302-2 may use this location to determine one or more nearby TRPs, and thus to affect a transmission power, a transmit frequency, and/or a transmit beam used by the UE 302-2 to send a UL-SRS for positioning signal.

At stage 1125, the UE 302-2 takes one or more measurements of one or more signals. At stage 1125, the UE 302-2 measures one or more signals to obtain measurements appropriate to the position-determination model obtained at stage 1123 that the UE 302-2 will use to determine location. For example, the UE 302-2 may measure a signal responsive to the UL-SRS for positioning signal sent at stage 1124. What measurement(s) is(are) taken, how, and/or for which TRP(s) may depend on the model obtained at stage 1123. For example, the UE 302-2, e.g., the processing system 332, may determine a time window placement (an FFT (Fast Fourier Transform) window placement) for searching for a positioning signal. As other examples, the UE 302-2 may determine a Doppler spread, a Doppler shift, an average delay, and/or a delay spread and use the determined information to affect how the UE 302-2 measures an incoming positioning signal from the gNB 304 (or other TRP). The UE 302-2 may also, or alternatively, affect the measurement of a positioning signal based on other assistance data, e.g., one or more feature vectors. For example, if data of a received feature is similar to a measurement obtained at stage 1112, then the UE 302-2 may affect which positioning signals to attempt to measure (e.g., from nearby TRP(s)). To do so, the UE 302-2 may affect, e.g., a time window for measurement, a direction of antenna beam to use for measurement, etc.

At stage 1126, the UE 302-2 determines a position of the UE 302-2. The UE 302-2 uses the measurement(s) taken at stage 1125 in the model obtained at stage 1123 to determine the position of the UE 302-2.

Figure 12:
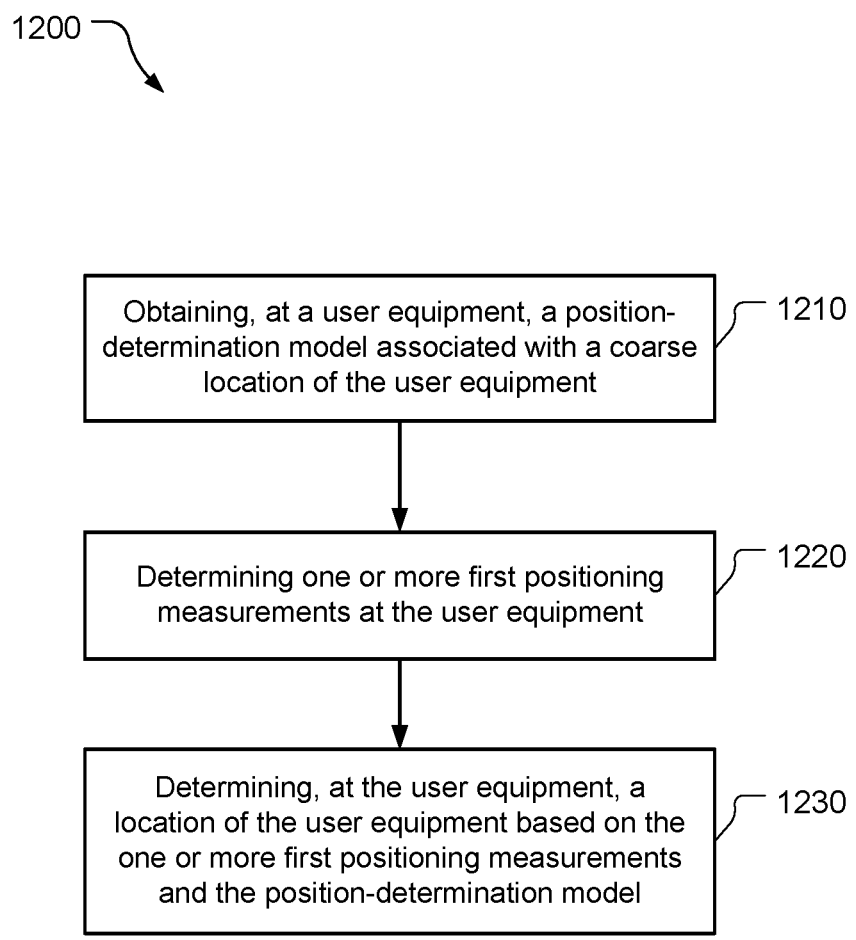
FIG. 12 is a block flow diagram of a method of determining user equipment location.

Referring to FIG. 12, with further reference to FIGS. 1-11, a method 1200 of determining a location of a user equipment includes the stages shown. The method 1200 is, however, an example only and not limiting. The order of the stages shown in FIG. 12 is not a required order of performance of the stages. The method 1200 may be altered, e.g., by having stages added, removed, rearranged, combined, performed concurrently, and/or having single stages split into multiple stages. Still other alterations to the method 1200 as shown and described may be possible.

At stage 1210, the method 1200 includes obtaining, at a user equipment, a position-determination model associated with a coarse location of the user equipment. For example, the UE 302 (e.g., the processor 332) may read the position-determination model (or models) from the memory 338. The processor 332 may request and receive the model (or models) from another entity such as another UE using a sidelink communication (e.g., the request at stage 1120) or the apparatus 306 using an uplink communication (e.g., the request at stage 1119). The request may indicate a position-determining technique corresponding to the position-determination model. If multiple models are obtained, the UE 302 may combine two or more of the models into a single model for use, or the UE 302 may select one of the models for use. The UE 302 may modify the model (with or without using signal measurement information) before using the model to determine a position of the UE 302. As another example, the UE 302 (e.g., the processor 332) may use positioning information such as one or more first feature vectors, e.g., one or more second positioning measurements determined by another UE and one or more corresponding locations, to train a position-determination model (e.g., establish the model or adapt (e.g., refine) an existing position-determination model) using one or more machine-learning techniques either presently known or developed in the future. The positioning information may include one or more position determination models and/or information that may be used to train the model (create the model or modify an existing model) and/or other information that may be used to update (adapt) a model. For example, the positioning information may be one or more feature vectors and/or one or more position-determination model updates from the LMF 306 or another entity, e.g., a server. The UE 302 may modify an existing position-determination model before using the positioning information to train the model or using update information to update the model. The UE 302 may select a subset of received feature vectors and/or a subset of received signal measurements to use in training the model. Also or alternatively, the UE 302 may use the position-determination-model updates (if received) to refine an existing position-determination model. To refine the model, the UE 302 may adjust one or more parameters (e.g., coefficients) of the model and determine whether the revised model better determines the position based on an input set of measurements. The UE 302 may iterate the model parameters to better determine the position, and may cease iterating the parameters once changes to the parameters yield a differentially-better position that is less than a threshold value better (e.g., a range to the predicted value changes by less than a threshold amount, such as 1% or 0.1%, etc.). After training and/or updating an existing model, the UE 302 may modify the trained and/or updated model with or without using measurement information. The processor 332 (possibly in conjunction with the memory 338), and possibly the communication device 308 (e.g., the receiver 312 and possibly the transmitter 310) may comprise means for obtaining the position-determination model, possibly including means for training the model using a received feature vector and/or a received position-determination-model update.

At stage 1220, the method 1200 includes determining one or more first positioning measurements at the user equipment. For example, the UE 302, e.g., the receiver 312, measures a received signal (e.g., a PRS signal, an SRS, a communication signal, etc.) to determine a signal measurement (e.g., RSSI, RTT, RSRP, RSRQ, ToA, AoA, etc.). The processor 332 (possibly in conjunction with the memory 338) may process one or more signal values to determine the signal measurement. The one or more first positioning measurements may be a measurement that can be used as an input to the position-determination model for determining a location of the user equipment. The receiver 312 and the processor 332 (and possibly the memory 338) may comprise means for determining one or more first positioning measurements.

At stage 1230, the method 1200 includes determining, at the user equipment, a location of the user equipment based on the one or more first positioning measurements and the position-determination model. For example, the processor 332 (possibly in conjunction with the memory 338) uses the first positioning measurement(s) as input to the position-determination model and calculates a result of the model as the location of the UE 302. The processor 332 may use one or more other values (e.g., one or more other measurements) in addition to the first positioning measurement(s) as input to the position-determination model as appropriate. The processor (and possibly the memory 338) may comprise means for determining the location of the UE.

The method 1200 may include one or more of the following features. For example, the method 1200 may include sending a request for the first feature vector wirelessly from the user equipment in at least one of an uplink communication or a sidelink communication. For example, the UE 302 may send a request for the first feature vector wirelessly from the UE 302 in an uplink communication (e.g., see stage 1119) and/or in a sidelink communication (e.g., the request at stage 1120). The processor 332 (possibly in conjunction with the memory 338) may cause the transmitter 310 to send the request, and thus the processor 332, possibly the memory 338, and the transmitter 310 may comprise means for sending the request. The request for the first feature vector may include a second feature vector including third positioning measurements corresponding to (e.g., of the same measurement type(s) as) the second positioning measurements. The request may be a vector of measurements (without the position of the UE 302) where the UE 302 wants to receive feature vectors of the same measurements and corresponding positions. That is, the third signal measurements may correspond to the second positioning measurements in that the third signal measurements may be the same measurements as the second positioning measurements, or could be measurements for the same position-determination technique as the second positioning measurements even if there are more or fewer third signal measurements than second positioning measurements. Thus, there may not be a one-to-one correspondence between the second positioning measurements provided in response to the third signal measurements included in the request. The request for the positioning information may be sent to a location server in an uplink communication (e.g., via a gNB over a Uu interface between the UE 302 and the gNB 304). For example, the UE 302 may send the request as a UL signal, conforming to the LPP protocol, to the LMF 306 via the base station 304. The request for the positioning information may be sent to another UE in a sidelink communication. For example, the UE 302 may send the request as a sidelink signal to the UE 510 using a D2D or peer-to-peer technology such as LTE Direct (LTE-D), WiFi Direct (WiFi-D), Bluetooth®, etc. The second positioning measurements may include CER information including an RSRP indication, an RSSI, and/or a TRP ID. The second positioning measurements may include RSTD information including a TRP ID, a neighbor TRP ID, a UE Rx-Tx indication, an RSRP indication, and associated positioning-signal resources and/or associated positioning-signals resource sets, and a timing measurement quality metric.

Also or alternatively, the method 1200 may include determining whether to use information received by the user equipment to obtain the position-determination model based on a timestamp included in the information received by the user equipment. For example, the UE 302 may analyze one or more timestamps associated with respective feature vectors to determine whether to use the feature vector to train the position-determination model. The UE 302 (e.g., the processor 332 and possibly the memory 338) determines whether the feature vector is too old to be reliable, and/or may determine whether the feature vector was taken under similar conditions to those presently existing or existing at the time of taking of one or more signal measurements to be used in the position model to determine the location of the UE 302. For example, the UE 302 may give more weight to feature vectors taken more recently and/or at similar times (assumed to be under similar conditions) to the present time, and may give less weight (or even ignore) feature vectors taken longer ago than a threshold time and/or at dissimilar times (assumed to be under dissimilar conditions) to the present time. The processor 332 and possibly the memory 338 may comprise means for determining whether to use the positioning information to adapt the position-determination model based on a timestamp included in the positioning information.

Also or alternatively, the method 1200 may include one or more of the following features. For example, the method 1200 may include determining, at the user equipment, the coarse location of the user equipment and sending a request for the position-determination model, with the request including the coarse location of the user equipment. For example, the processor UE 332 may determine the coarse location of the UE 302 and send the coarse location in a request (e.g., see stage 1119) to the apparatus (e.g., gNB) 304 and/or the apparatus (e.g., LMF) 306. The processor 332, the memory 338, and the communication device 308 (e.g., the transmitter 310) may comprise means for determining the coarse location and means for sending a request for the position-determination model. The LMF 306 may compile feature vectors for distribution to UEs, e.g., before being requested by the UE 302 for assistance data. The LMF 306 may receive signal measurements from UEs, with or without corresponding locations. The LMF 306 may determine corresponding locations for the feature vectors (even if a feature vector included a location). The LMF 306 may send requests to UEs for the signal measurements to be used in the feature vectors and/or the UEs may send the signal measurements without being requested, e.g., as part of a protocol. The UE 302 may use the location determined by the UE 302 for a variety of purposes or applications. For example, the location may be used as part of a navigation application, or to direct advertisements to a user of the UE 302, to trigger alerts to the user, to provide location information to emergency personnel (e.g., to fire fighters), etc.

Also or alternatively, the method 1200 may include one or more of the following features. For example, determining the one or more first positioning measurements may be based on the position-determination model. For example, the processing system 332 may affect what signals, and/or how the signals, and/or from which TRPs signals are measured by the UE 302. The processing system 332 (e.g., one or more of the processors 230, 231, 232) and the receiver 312 (e.g., the receiver 244) may comprise means for determining the one or more first positioning measurements. As another example, the method 1200 may include transmitting a sounding reference signal based on the position-determination model. For example, the processing system 332 may affect how uplink positioning signals are transmitted from the UE 302. The processing system 332 (e.g., one or more of the processors 230, 231, 232) and the transmitter 310 (e.g., the transmitter 242) may comprise means for transmitting a sounding reference signal based on the position-determination model.

Other Considerations

Having described several example configurations, other examples or implementations including various modifications, alternative constructions, and equivalents may be used without departing from the spirit of the disclosure. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Elements discussed may be components of a larger system, wherein other rules may take precedence over or otherwise modify the application of the invention. Also, a number of operations may be undertaken before, during, or after above-discussed elements or operations are considered. Accordingly, the above description does not bound the scope of the claims.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "processor-readable medium," "machine-readable medium," and "computer-readable medium," or the like as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled unless otherwise noted. That is, they may be directly or indirectly connected to enable communication between them.

A statement that a value exceeds (or is more than or above) a threshold value (e.g., a first threshold value) is equivalent to a statement that the value meets or exceeds another threshold value (e.g., a second threshold value) that is slightly greater than the first threshold value, e.g., the second threshold value being one value higher than the first threshold value in the resolution of a computing system. A statement that a value is less than (or is within or below) a threshold value (e.g., first threshold value) is equivalent to a statement that the value is less than or equal to another threshold value (e.g., a second threshold value) that is slightly lower than the first threshold value, e.g., the second threshold value being one value lower than the first threshold value in the resolution of a computing system.

The invention claimed is:

1. A user equipment comprising:
    a receiver configured to receive wireless signals;
    a memory; and
    a processor communicatively coupled to the receiver and the memory, the processor configured to:
        determine a coarse location of the user equipment;
        obtain a position-determination model based on the coarse location of the user equipment, wherein the position-determination model comprises one or more feature vectors or a machine-learning model and wherein the one or more feature vectors comprise one or more signal measurements previously performed by one or more devices;
        determine one or more first positioning measurements of one or more reference signals from one or more transmission/reception points (TRPs), wherein the one or more first positioning measurements comprises one or more reference signal time differences, one or more receive-transmit time differences, or a combination thereof; and
        determine a location of the user equipment based on the one or more first positioning measurements, one or more TRP identities associated with the one or more first positioning measurements, and the position-determination model;
    wherein to obtain the position-determination model, the processor is configured to use a first feature vector to train the position-determination model, the first feature vector including second positioning measurements from another user equipment and a corresponding location; and
    wherein the processor is configured to send a request for the first feature vector via the transmitter in at least one of an uplink communication or a sidelink communication, the request for the first feature vector including a second feature vector including third positioning measurements of the same measurement types as the second positioning measurements.

2. The user equipment of claim 1, wherein the processor is configured to establish the position-determination model based on the first feature vector.

3. The user equipment of claim 1, wherein the position-determination model is a first position-determination model, and wherein the processor is configured to adapt, based on the first feature vector, a second position-determination model to obtain the first position-determination model.

4. The user equipment of claim 1, wherein the second positioning measurements include:
    Channel Energy Response (CER) information including a reference signal receive power (RSRP) indication, or a received signal strength indication (RSSI), or a transmission/reception point identity (TRP ID), or a combination thereof; or
    Reference Signal Time Difference (RSTD) information including a reference TRP ID, a neighbor TRP ID, a user equipment receive-transmit time difference (UE Rx-Tx), the RSRP indication and at least one of associated positioning-signal resources or associated positioning-signal resource sets, and at least one timing measurement quality metric.

5. The user equipment of claim 1, further comprising a transmitter communicatively coupled to the processor, wherein to obtain the position-determination model the processor is configured to determine the coarse location of the user equipment and to send a request for the position-determination model via the transmitter, the request including the coarse location of the user equipment.

6. The user equipment of claim 1, further comprising a transmitter communicatively coupled to the processor, wherein to obtain the position-determination model the processor is configured to send a request for the position-determination model to another user equipment in a sidelink communication.

7. The user equipment of claim 1, further comprising a transmitter communicatively coupled to the processor, wherein to obtain the position-determination model the processor is configured to send a request for the position-determination model via the transmitter, the request for the position-determination model including an indication of a position-determination technique corresponding to the position-determination model.

8. The user equipment of claim 1, wherein the processor is configured to use a received position-determination-model update to obtain the position-determination model.

9. The user equipment of claim 1, wherein the processor is configured to determine whether to use information received by the receiver to obtain the position-determination model based on a timestamp included in the information received by the receiver.

10. The user equipment of claim 1, wherein the processor is configured to affect measurement of the wireless signals based on the position-determination model.

11. The user equipment of claim 1, further comprising a transmitter communicatively coupled to the processor, wherein the processor is configured to affect transmission of a sounding reference signal by the transmitter based on the position-determination model.

12. A method of determining a location of a user equipment, the method comprising:
determining, at the user equipment, a coarse location of the user equipment;
obtaining, at the user equipment, a position-determination model based on the coarse location of the user equipment, wherein the position-determination model comprises one or more feature vectors or a machine-learning model and wherein the one or more feature vectors comprise one or more signal measurements previously performed by one or more devices;
determining, at the user equipment, one or more first positioning measurements of one or more reference signals from one or more transmission/reception points (TRPs), wherein the one or more first positioning measurements comprises one or more reference signal time differences, one or more receive-transmit time difference, or a combination thereof; and
determining, at the user equipment, the location of the user equipment based on the one or more first positioning measurements, one or more TRP identities associated with the one or more first positioning measurements, and the position-determination model;
wherein the user equipment is a first user equipment, and wherein obtaining the position-determination model comprises training the position-determination model using a first feature vector including second positioning measurements from a second user equipment and a corresponding location; and
wherein the method of determining the location of the user equipment further comprises sending a request for the first feature vector wirelessly from the first user equipment in at least one of an uplink communication or a sidelink communication, the request for the first feature vector including a second feature vector including third positioning measurements of the same measurement types as the second positioning measurements.

13. The method of claim 12, wherein obtaining the position-determination model comprises establishing the position-determination model based on the first feature vector.

14. The method of claim 12, wherein the position-determination model is a first position-determination model, and wherein obtaining the first position-determination model comprises adapting a second position-determination model based on the first feature vector.

15. The method of claim 12, wherein the second positioning measurements include:
Channel Energy Response (CER) information including a reference signal receive power (RSRP) indication, or a received signal strength indication (RSSI), or a transmission/reception point identity (TRP ID), or a combination thereof; or
Reference Signal Time Difference (RSTD) information including a reference TRP ID, a neighbor TRP ID, a user equipment receive-transmit time difference (UE Rx-Tx), the RSRP indication and at least one of associated positioning-signal resources or associated positioning-signal resource sets, and at least one timing measurement quality metric.

16. The method of claim 12, further comprising determining, at the user equipment, the coarse location of the user equipment, wherein obtaining the position-determination model comprises sending a request for the position-determination model, the request including the coarse location of the user equipment.

17. The method of claim 12, wherein the user equipment is a first user equipment, and wherein obtaining the position-determination model comprises sending a request for the position-determination model to a second user equipment in a sidelink communication.

18. The method of claim 12, wherein obtaining the position-determination model comprises sending a request for the position-determination model, the request for the position-determination model including an indication of a position-determination technique corresponding to the position-determination model.

19. The method of claim 12, wherein obtaining the position-determination model comprises using a received position-determination-model update to obtain the position-determination model.

20. The method of claim 12, wherein obtaining the position-determination model comprises determining whether to use information received by the user equipment to obtain the position-determination model based on a timestamp included in the information received by the user equipment.

21. The method of claim 12, wherein determining the one or more first positioning measurements is based on the position-determination model.

22. The method of claim 12, further comprising transmitting a sounding reference signal based on the position-determination model.

23. A user equipment comprising:
means for determining a coarse location of the user equipment;
means for obtaining a position-determination model based on the coarse location of the user equipment, wherein the position-determination model comprises one or more feature vectors or a machine-learning model and wherein the one or more feature vectors comprise one or more signal measurements previously performed by one or more devices;
means for determining one or more first positioning measurements of one or more reference signals from one or more transmission/reception points (TRPs), wherein the one or more first positioning measurements comprises one or more reference signal time differences, one or more receive-transmit time differences, or a combination thereof; and
means for determining a location of the user equipment based on the one or more first positioning measurements, one or more TRP identities associated with the one or more first positioning measurements, and the position-determination model;
wherein the means for obtaining comprise means for training the position-determination model using a first feature vector including second positioning measurements from a second user equipment and a corresponding location; and
wherein the means for obtaining comprise means for sending a request for the first feature vector wirelessly from the user equipment in at least one of an uplink communication or a sidelink communication, the request for the first feature vector including a second feature vector including third positioning measurements of the same measurement types as the second positioning measurements.

24. The user equipment of claim 23, wherein the means for obtaining are means for establishing the position-determination model based on the first feature vector.

25. The user equipment of claim 23, wherein the position-determination model is a first position-determination model, and wherein the means for obtaining are means for adapting a second position-determination model based on the first feature vector to obtain the first position-determination model.

26. The user equipment of claim 23, wherein the second positioning measurements include:
Channel Energy Response (CER) information including a reference signal receive power (RSRP) indication, or a received signal strength indication (RSSI), or a transmission/reception point identity (TRP ID), or a combination thereof; or
Reference Signal Time Difference (RSTD) information including a reference TRP ID, a neighbor TRP ID, a user equipment receive-transmit time difference (UE Rx-Tx), the RSRP indication and at least one of associated positioning-signal resources or associated positioning-signal resource sets, and at least one timing measurement quality metric.

27. The user equipment of claim 23, further comprising means for determining the coarse location of the user equipment, wherein the means for obtaining are means for sending a request for the position-determination model, the request including the coarse location of the user equipment.

28. The user equipment of claim 23, wherein the means for obtaining are means for sending a request for the position-determination model to a second user equipment in a sidelink communication.

29. The user equipment of claim 23, wherein the means for obtaining are means for sending a request for the position-determination model, the request for the position-determination model including an indication of a position-determination technique corresponding to the position-determination model.

30. The user equipment of claim 23, wherein the means for obtaining are means for using a received position-determination-model update to obtain the position-determination model.

31. The user equipment of claim 23, wherein the means for obtaining are means for determining whether to use information received by the user equipment to obtain the position-determination model based on a timestamp included in the information received by the user equipment.

32. The user equipment of claim 23, wherein the means for determining the one or more first positioning measurements are for determining the one or more first positioning measurements based on the position-determination model.

33. The user equipment of claim 23, further comprising means for transmitting a sounding reference signal based on the position-determination model.

34. A non-transitory, processor-readable storage medium comprising processor-readable instructions configured to cause a processor of a user equipment to:
determine a coarse location of the user equipment;
obtain a position-determination model based on the coarse location of the user equipment, wherein the position-determination model comprises one or more feature vectors or a machine-learning model and wherein the one or more feature vectors comprise one or more signal measurements previously performed by one or more devices;
determine one or more first positioning measurements of one or more reference signals from one or more transmission/reception points (TRPs), wherein the one or more first positioning measurements comprises one or more reference signal time differences, one or more receive-transmit time differences, or a combination thereof; and
determine a location of the user equipment based on the one or more first positioning measurements, one or more TRP identities associated with the one or more first positioning measurements, and the position-determination model;
wherein the user equipment is a first user equipment;
wherein the processor-readable instructions configured to cause the processor to obtain the position-determination model comprise processor-readable instructions configured to cause the processor to:
train the position-determination model using a first feature vector including second positioning measurements from a second user equipment and a corresponding location; and
send a request for the first feature vector wirelessly from the first user equipment in at least one of an uplink communication or a sidelink communication, the request for the first feature vector including a second feature vector including third positioning measurements of the same measurement types as the second positioning measurements.

35. The non-transitory, processor-readable storage medium of claim 34, wherein the instructions configured to cause the processor to obtain the position-determination model comprise instructions configured to cause the processor to establish the position-determination model based on the first feature vector.

36. The non-transitory, processor-readable storage medium of claim 34, wherein the position-determination model is a first position-determination model, and wherein the instructions configured to cause the processor to obtain the first position-determination model comprise instructions configured to cause the processor to adapt a second position-determination model based on the first feature vector.

37. The non-transitory, processor-readable storage medium of claim 34, wherein the second positioning measurements include:
Channel Energy Response (CER) information including a reference signal receive power (RSRP) indication, or a received signal strength indication (RSSI), or a transmission/reception point identity (TRP ID), or a combination thereof; or
Reference Signal Time Difference (RSTD) information including a reference TRP ID, a neighbor TRP ID, a user equipment receive-transmit time difference (UE Rx-Tx), the RSRP indication and at least one of associated positioning-signal resources or associated positioning-signal resource sets, and at least one timing measurement quality metric.

38. The non-transitory, processor-readable storage medium of claim 34, further comprising instructions configured to cause the processor to determine the coarse location of the user equipment, wherein the instructions configured to cause the processor to obtain the position-determination model comprise instructions configured to cause the processor to send a request for the position-determination model, the request including the coarse location of the user equipment.

39. The non-transitory, processor-readable storage medium of claim 34, wherein the instructions configured to cause the processor to obtain the position-determination model comprise instructions configured to cause the processor to send a request for the position-determination model to another user equipment in a sidelink communication.

40. The non-transitory, processor-readable storage medium of claim 34, wherein the instructions configured to cause the processor to obtain the position-determination model comprise instructions configured to cause the processor to send a request for the position-determination model, the request for the position-determination model including an indication of a position-determination technique corresponding to the position-determination model.

41. The non-transitory, processor-readable storage medium of claim 34, wherein the instructions configured to cause the processor to obtain the position-determination model comprise instructions configured to cause the processor to use a received position-determination-model update to obtain the position-determination model.

42. The non-transitory, processor-readable storage medium of claim 34, wherein the instructions configured to cause the processor to obtain the position-determination model comprise instructions configured to cause the processor to determine whether to use information received by the user equipment to obtain the position-determination model based on a timestamp included in the information received by the user equipment.

43. The non-transitory, processor-readable storage medium of claim 34, wherein the instructions configured to cause the processor to determine the one or more first positioning measurements are configured to cause the processor to determine the one or more first positioning measurements based on the position-determination model.

44. The non-transitory, processor-readable storage medium of claim 34, further comprising instructions configured to cause the processor to transmit a sounding reference signal based on the position-determination model.

45. The user equipment of claim 9, wherein the processor is configured to determine whether to use information received by the receiver to obtain the position-determination model based on an age of the information received by the receiver based on the timestamp, or based on a similarity of a time indicated by the timestamp and a present time, or a combination thereof.

* * * * *